US 6,697,552 B2
Feb. 24, 2004

(54) DENDRITIC TAPER FOR AN INTEGRATED OPTICAL WAVELENGTH ROUTER

(75) Inventors: Kenneth McGreer, Fremont, CA (US); Liang Zhao, San Jose, CA (US); Jane Lam, San Jose, CA (US); Hao Xu, Sunnyvale, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 95 days.

(21) Appl. No.: 09/848,093

(22) Filed: May 3, 2001

(65) Prior Publication Data

US 2003/0012497 A1 Jan. 16, 2003

Related U.S. Application Data

(60) Provisional application No. 60/271,049, filed on Feb. 23, 2001.

(51) Int. Cl.[7] .................................................. G02B 6/34
(52) U.S. Cl. .............................. 385/37; 385/43; 385/50
(58) Field of Search ............................. 385/14, 37, 24, 385/46, 31, 43, 44, 45, 50

(56) References Cited

U.S. PATENT DOCUMENTS

| 4,070,092 A | 1/1978 | Burns .......................... 385/45 |
| 4,708,423 A | 11/1987 | Erman et al. .................. 385/14 |
| 4,840,446 A | 6/1989 | Nakamura et al. ........... 385/131 |
| 4,895,615 A | 1/1990 | Muschke ....................... 438/33 |

(List continued on next page.)

FOREIGN PATENT DOCUMENTS

| EP | 0 250 824 | 1/1988 |
| EP | 0 779 721 A2 | 6/1997 |
| EP | 0 791 842 A2 | 8/1997 |
| EP | 0 826 988 | 3/1998 |
| EP | 0 903 616 A2 | 3/1999 |
| GB | 2199157 A | 6/1988 |
| JP | 62-119504 A2 | 5/1987 |
| JP | 04-241304 | 8/1992 |
| JP | 05-224245 A2 | 9/1993 |
| JP | 07-333447 | 12/1995 |
| JP | 2000-89047 | 3/2000 |
| WO | WO 91/03748 A1 | 3/1991 |

OTHER PUBLICATIONS

Doerr, C.R. et al. (2001). "Arrayed Waveguide Dynamic Gain Equalization Filter with Reduced Insertion Loss and Increased Dynamic Range," *IEEE Photonics Technology Letters* 13(4):329–331.

Okamoto, K. and Sugita, A. (Aug. 29, 1996). "Flat Spectral Response Arrayed–Waveguide Grating Multiplexer with Parabolic Waveguide Horns," *Electronics Letters* 32(18):1661–1662.

Dragone, C. (1998). "Efficient Techniques for Widening the Passband of a Wavelength Router," *J. Lightwave Technol.* 16(10): 1895–1906.

Ibsen, M. et al. (1996). "30dB Sampled Gratings in Germanosilicate Planar Waveguides," *Electronics Letters* 32(24):2233–2235.

(List continued on next page.)

*Primary Examiner*—David V. Bruce
*Assistant Examiner*—Therese Barber
(74) *Attorney, Agent, or Firm*—Morrison & Foerster LLP

(57) ABSTRACT

The present invention generally provides an optical wavelength router that includes at least one dendritic taper region. The dendritic taper region includes at least one dendritic taper which has a trunk and at least one branch optically coupled to the trunk. In addition to the dendritic taper region, the optical wavelength router includes at least one input waveguide, a input slab waveguide, an arrayed waveguide grating, an output slab waveguide, and at least one output waveguide. The improved optical wavelength router provides a wide passband width without a substantial effect on insertion loss.

56 Claims, 16 Drawing Sheets

U.S. PATENT DOCUMENTS

| | | | |
|---|---|---|---|
| 5,002,350 A | 3/1991 | Dragone | 359/124 |
| 5,008,043 A | 4/1991 | Robello et al. | 252/582 |
| 5,078,514 A | 1/1992 | Valette et al. | 385/20 |
| 5,136,671 A * | 8/1992 | Dragone | 385/46 |
| 5,157,756 A | 10/1992 | Nishimoto | 385/129 |
| 5,206,925 A | 4/1993 | Nakazawa et al. | 385/142 |
| 5,281,305 A | 1/1994 | Lee et al. | 216/24 |
| 5,341,444 A | 8/1994 | Henry et al. | 385/11 |
| 5,387,269 A | 2/1995 | Nijander et al. | 65/386 |
| 5,412,744 A | 5/1995 | Dragone | 385/24 |
| 5,465,860 A | 11/1995 | Fujimoto et al. | 216/24 |
| 5,467,418 A | 11/1995 | Dragone | 385/37 |
| 5,556,904 A | 9/1996 | Nishiguchi et al. | 524/147 |
| 5,581,642 A | 12/1996 | Deacon et al. | 385/15 |
| 5,623,571 A | 4/1997 | Chou et al. | 385/130 |
| 5,629,992 A | 5/1997 | Amersfoort et al. | 385/15 |
| 5,636,309 A | 6/1997 | Henry et al. | 385/129 |
| 5,657,408 A | 8/1997 | Ferm et al. | 385/43 |
| 5,677,688 A | 10/1997 | O'Mara et al. | 341/31 |
| 5,703,989 A | 12/1997 | Khan et al. | 385/130 |
| 5,706,377 A * | 1/1998 | Li | 385/37 |
| 5,739,931 A | 4/1998 | Zimmerman et al. | 359/619 |
| 5,745,618 A | 4/1998 | Li | 385/46 |
| 5,751,872 A | 5/1998 | Bissessur et al. | 385/37 |
| 5,768,450 A | 6/1998 | Bhagavatula | 385/24 |
| 5,841,919 A | 11/1998 | Akiba et al. | 385/37 |
| 5,889,906 A | 3/1999 | Chen | 385/28 |
| 5,926,298 A * | 7/1999 | Li | 359/120 |
| 5,930,439 A | 7/1999 | Ojha et al. | 385/129 |
| 5,940,555 A | 8/1999 | Inaba et al. | 385/24 |
| 5,982,960 A | 11/1999 | Akiba et al. | 385/24 |
| 6,069,990 A * | 5/2000 | Okawa et al. | 385/43 |
| 6,137,939 A | 10/2000 | Henry et al. | 385/132 |
| 6,181,848 B1 | 1/2001 | Bruno et al. | 385/24 |
| 6,205,273 B1 | 3/2001 | Chen | 385/37 |

OTHER PUBLICATIONS

Inoue, Y. et al. (2000). "Novel Birefringence Compensating AWG Design", *Optical Society of America*, pp. WB4–1–WB4–3.

Jouanno, J,–M. et al. (1997). "Low Crosstalk Planar Optical Add–Drop Multiplexer Fabricated with UV–Induced Bragg Gratings," *Electronics Letters* 33(25):2120–2121.

Kogelnik, H. (1988). "Theory of Opitcal Waveguides" Chapter 2 *In Guided–Wave Optoelectonics* pp. 7–81.

Lytel, R. et al. (1992). "Large–Scale Integration of Electro–Optic Polymer Waveguides." Chapter 16 *In Polymers for Ligthtwave and Integrated Optics, Technology and Applications.* L. A. Hornack ed., Marcel Decker, Inc., pp. 433–472.

McGreer, K. (1998). "Arrayed Waveguide Gratings For Wavelength Routing," *IEEE Communications Magazine* 36(12): 62–68.

Milton, A.F. and Burns, W.K. (1977). "Mode Coupling in Optical Waveguide Horns," *IEEE Journal of Quantum Electronics* QE–13(10):828–835.

Mori, H. (1978). "Ridge Wavguide Without High Refractive Index Layer: Multilayer Side Cladded Ridge Waveguide" *Applied Optics* 17(1):105–108.

Nadler, C. et al., (1999) "Polarization Insensitive, Low–Loss, Low–Crosstalk Wavelength Multiplexer Modules." 5(5):1407–1412.

Nishihara, H. et al., (1987). "2.4.2: Approximate Analyses of Guided Modes," *Optical Integrated Circuits* p. 29.

Okamoto, K. (2000). Chapter 9 *In Fundamentals of Optical Waveguides*. Optics and Photonics, Academic Press. pp. 346–381. (Includes Table of Contents).

Okamoto, K. and Sugita, A. (1996). "Flat Spectral Response Arrayed–Waveguide Grating Multiplexer with Parabolic Waveguide Horns," *Electronics Letters* 32(18):166–1662.

Okamoto, K. and Yamada, H. (1995). "Arrayed–Waveguide Grating Multiplexer with Flat Spectral Response," *Optics Letters*, 20(1): 43–45.

Ramey, D.A. and Boyd, J.T. (1979). "Polyurethane Fan–Out Channel Waveguide Array for High Resolution Optical Waveguide Imaging" *IEEE Trans. Circuits and Systems CAS* 26(12):1041–1048.

Ruberto, M.N. et al. (1990). "Graded–Effective–Index Waveguiding Structures Fabricated with Laser Processing" *Digital Optical Computing II, SPIE* 1215:538–557.

Smit, M.K. and Van Dam, C. (1996). "PHASAR–Based WDM–Devices: Principles, Design, and Applications," *IEEE Journal of Selected Topics in Quantum Electronics* 2(2):236–250.

Soldano, L.B. et al., (1992). "Planar Monomode Optical Couplers Based on Multimode Interference Effects," *Journal of Lightwave Technology* 10(12): 1843–1850.

Soole, J.B.D. et al., (1996). "Use of Multimode Interference Couplers to Broaden the Passband of Wavelength–Dispersive Integrated WDM Filters," *IEEE Photonics Technology Letters* 8(10): 1340–1342.

Vreeburg et al. (1998). "A Low–Loss 16–Channel Polarization Dispersion–Compensated PHASAR Demultiplexer," 10(3):382–384.

Yamada, H. et al. (2000). "Dispersion Resulting from Phase and Amplitude Errors in Arrayed—Waveguide Grating Multiplexers–Demultiplexers", *Optics Letters* 25(8): 569–571.

* cited by examiner

DENDRITIC TAPER FOR AN INTEGRATED OPTICAL WAVELENGTH ROUTER

FIELD OF THE INVENTION

This invention relates generally to planar lightwave circuits for use in optical signal routing applications, in particular, planar lightwave circuits having arrayed waveguide gratings.

BACKGROUND

The increase in Internet traffic, the number of telephones, fax machines, computers with modems, and other telecommunications services and equipment over the past several years has caused researchers to explore new ways to increase fiber optic network capacity by carrying multiple data signals concurrently through telecommunications lines. To expand fiber network capacity, fairly complex optical components have already been developed for wavelength division multiplexing (WDM) and dense wavelength division multiplexing (DWDM).

In a WDM system, multiple optical data signals of different wavelengths are added together in a device called a multiplexer and the resulting data signal is transmitted over a fiber optic cable. The wavelength division multiplexed signal comprises a plurality of optical signals having a predetermined nominal wavelength difference from each other. A demultiplexer separates the multiple optical data signals of different wavelength. Any WDM system must include at least one component to perform the function of optical multiplexing (namely, the multiplexer) and at least one component to perform the function of optical demultiplexing (namely, the demultiplexer). The optical multiplexer and the optical demultiplexer are each examples of optical wavelength routers.

In general, an optical wavelength router has at least one input optical port and at least on output optical port. In an optical router, light may be transmitted from a specific input port to a specific output port only if the light has an appropriate wavelength. Complex WDM systems may require optical wavelength router components that are more complex than a multiplexer or a demultiplexer. For example, an arrayed waveguide grating (AWG) or an integrated reflection grating may be used in a multiplexer, a demultiplexer, or a more general optical router.

Planar lightwave circuit technology is one technology that may be used to implement an optical wavelength router. A planar lightwave circuit (PLC) is an application of integrated optics. In a PLC, light is restricted to propagate in a region that is thin (typically between approximately 1 μm and 30 μm) in one dimension, referred to herein as the lateral dimension, and extended (typically between 1 mm and 100 mm) in the other two dimensions. A plane that is perpendicular to the lateral dimension of the PLC is defined as the plane of the PLC. The longitudinal direction is defined as the direction of propagation of light at any point on the PLC. The lateral direction is defined to be perpendicular to the plane of the PLC. The transverse direction is defined to be perpendicular to both the longitudinal and the lateral directions.

In a typical example of a PLC, a slab waveguide comprises three layers of silica glass are used with the core layer lying between the top cladding layer and the bottom cladding layer. Channel waveguides are often formed by at least partially removing (typically with an etching process) core material beyond the transverse limits of the channel waveguide and replacing it with at least one layer of side cladding material that has an index of refraction that is lower than that of the core material. The side cladding material is usually the same material as the top cladding material. In this example, each layer is doped in a manner such that the core layer has a higher index of refraction than either the top cladding or bottom cladding. When layers of silica glass are used for the optical layers, the layers are typically deposited on a silicon wafer. As a second example, slab waveguides and channel waveguides comprise three or more layers of InGaAsP. In this example, adjacent layers have compositions with different percentages of the constituent elements In, P, Ga, and As. As a third example, one or more of the optical layers of the slab waveguide and/or channel waveguide may comprise an optically transparent polymer. Another example of a slab waveguide comprises a layer with a graded index such that the region of highest index of refraction is bounded by regions of lower indices of refraction. A doped-silica waveguide is usually preferred because it has a number of attractive properties including low cost, low loss, low birefringence, stability, and compatibility for coupling to fiber.

A PLC optical router comprises an optical waveguide for each input optical port and an optical waveguide for each output port. Each input and output optical waveguide confines the light in both the lateral and the transverse direction. A PLC optical router also comprises at least one region comprising a slab waveguide, which confines the light in the lateral direction but not in the transverse direction. A PLC optical router further comprises at least one optical dispersive region, which may be either an arrayed waveguide grating (AWG) region or an integrated reflection grating.

FIG. 1 depicts an AWG optical router that acts as a demultiplexer 10. A plurality of optical signals incident on one input optical port propagates through the device in the following sequence: the signals propagate through an input waveguide 12, which is a input waveguide associated with the input port; through an input slab waveguide 14, which has the function of expanding the optical field in the transverse direction by diffraction; through the dispersive region 16 (namely, the array waveguide region) comprising an array of AWG waveguides 18 for modifying the direction of propagation for each wavelength constituent according to the wavelength of the constituent of the plurality of signals; through an output slab waveguide 20 for focusing the signals of different wavelength coupled from the dispersive region 16 into a plurality of predetermined positions in accordance with the predetermined wavelength difference; through a plurality of output waveguides 22 each associated with one output port.

The dispersive property of the arrayed waveguide grating (AWG) region is attributable to the construction of the plurality of waveguides within the waveguide grating region such that adjacent waveguides have a predetermined length difference in accordance to the required dispersive properties of the dispersive region 16, so that each signal at different wavelength coupled to and traveling over each channel waveguide is provided with a phase difference from each other in accordance with the predetermined length difference. Each of the output waveguides 22 includes an input end 24, which is arranged at a predetermined position, so that each separated signal at each wavelength is coupled to each output waveguide 22 and emerges from an output end 26 thereof.

In operation, the wavelength division multiplexed signals coupled into the input channel waveguide 12 expand into the input slab waveguide 14 by diffraction. Then, the expanded signals are distributed to the channel waveguides 18 of the arrayed-waveguide grating 16. Because each channel waveguide 18 of the arrayed-waveguide grating 16 has a predetermined waveguide length difference, each signal, after traveling over each channel waveguide 18 to the output slab waveguide 20, has a predetermined phase difference according to its waveguide length difference. Since the phase difference depends on the wavelength of the signal, each signal at different wavelength is focused on a different position along the arc boundary 28 of the output slab waveguide 20. As a result, separated signals, each having a different wavelength, are received by the plurality of output channel waveguides 22 and emerge therefrom, respectively.

The general principles and performance of an AWG multiplexer are similar to the AWG demultiplexer, except that the direction of propagation of light is reversed, the ports that act as inputs for the demultiplexer act as output ports for the multiplexer, and the ports that act as output ports for the demultiplexer act as input ports for the multiplexer.

Multiple routing functions including multiplexing and demultiplexing may be integrated on a silicon wafer to form a complex planar lightwave circuit (PLC). PLCs can be made using tools and techniques developed to extremely high levels by the semiconductor industry. Integrating multiple components on a PLC may reduce the manufacturing, packaging, and assembly costs per function.

The details of the design and manufacture of an optical router comprising an AWG depend to some extent on the performance requirements. Aspects of performance that are affected by the present invention are referred to as insertion loss, passband width, ripple, and adjacent channel isolation. These terms, as well as a number of related terms will now be defined.

Spectral transmissivity (in units of dB) is defined as the optical power (in units of dBm) of substantially monochromatic light that emerges from the fiber that is coupled to the input port minus the optical power (in units of dBm) of the light that enters the optical fiber that is coupled to the output port of the optical router. Spectral transmissivity is a function of the selected input port, the selected output port, the optical wavelength, and the polarization state of the incident light. As illustrated, for example, in FIG. 2a, the maximal spectral transmissivity 30 refers to the spectral transmissivity for the incident polarization state that provides the maximum value for spectral transmissivity. The minimal spectral transmissivity 32 refers to the spectral transmissivity for the incident polarization state that provides the minimal value for spectral transmissivity. In general, the incident polarization state used to determine maximal and minimal spectral transmissivities is a function of wavelength, and depends on the input port and the output port used. The mean spectral transmissivity (in dB units) 34 is defined as the mean of the maximal spectral transmissivity (in dB units) 30 and the minimal spectral transmissivity (in dB units) 32.

Insertion loss (IL) is illustrated in FIG. 2b. The insertion loss for a particular input/output port combination is defined as the minimum value 36 of the minimal spectral transmissivity 38 within the International Telecommunication Union (ITU) band 40 (i.e., a 0.2 nm range of wavelengths that is centered on a predetermined target wavelength) for the particular input/output port combination. The center wavelength (CW) for a particular input/output port combination is defined as the mean value of all wavelengths of light that provide a mean spectral transmissivity that is larger than −3 dB.

Ripple is illustrated with reference to FIGS. 2c and 2d. Ripple (in dB units) for a particular input/output combination is defined as the maximum value 42 of the maximal spectral transmissivity 44 within the ITU band 46 minus the minimum value 48 of the minimal spectral sensitivity 50 within the ITU band 46. For example, FIG. 2c corresponds to a relatively small disparity in taper widths and FIG. 2d corresponds to a relatively large disparity in taper widths.

The passband width depends on a predetermined reference insertion loss level and the particular input/output combination. Of particular interest is the value denoted as "−1.0 BW", which is the passband width with respect to the −1 dB insertion loss reference level. For example, as shown in FIG. 2e, −1.0 BW is defined as the difference in wavelength between a first wavelength and a second wavelength, wherein both the first and the second wavelengths provide a mean spectral transmissivity that equals −1.0 dB for a particular input/output port combination, and the first wavelength is larger than the center wavelength (CW) and the second wavelength is smaller than the center wavelength. The definitions of −0.5 BW, −3.0BW and −20BW are the same as −1.0BW, except that the spectral transmissivity reference levels are −0.5 dB, −3.0 dB and −20 dB respectively.

Adjacent isolation (ADJ_ISO) is illustrated in FIG. 2f. For a multiplexer, ADJ_ISO is defined as the difference between a first spectral transmissivity 52 and a second spectral transmissivity 54, wherein the first spectral transmissivity is the minimum 52 of the minimal spectral transmissivity 54 within the ITU band 58 associated with a predetermined first input/output port combination and the second spectral transmissivity is the maximum 54 of the maximal spectral transmissivity 60 associated with a second input/output port combination, wherein the first and second input/output port combinations share a common output port and the input ports of the first and second input/output ports combinations are adjacent. ADJ_ISO for a demultiplexer is defined in a similar manner, except that a common input port is used and adjacent output ports are used in the definition.

IL_AVE is defined as the average (AVE) insertion loss (IL) of values for all input/output port combinations that are used for a particular application of the device. RIPPLE_AVE, −0.5BW_AVE, −1.0BW_AVE, −3.0BW_AVE, −20 BW_AVE, and ADJ_ISO_AVE, have similar definitions.

IL_WC is defined as the value of insertion loss (IL) for the input/output combination (selected from among those that are used for a particular application) that provides the "worst case" (WC) value of IL, i.e., the smallest IL value. RIPPLE_WC is defined as the value of RIPPLE for the input/output combination (selected from among those that are used for a particular application) that provides "worst case" value of RIPPLE, i.e., the largest value of RIPPLE.

The performance requirements depend to some extent on the type of AWG optical router. For example, the performance requirements for a multiplexer differ to some extent from the performance requirements of a demultiplexer. High adjacent channel isolation (i.e. a small value for ADJ_ISO) is critical for a demultiplexer, but of no consequence for a multiplexer. A low insertion loss (i.e., a high value for IL), a wide passband width and low ripple are desirable for both a multiplexer and a demultiplexer; however, the design changes to achieve each of these individually may be contrary to the design requirements imposed by other performance requirements. For example, a design change to widen the passband may increase insertion loss (i.e., reduce the IL value). As a second example, a design change to widen the passband may reduce adjacent channel isolation (i.e., increase ADJ_ISO). This second example is important for a demultiplexer but is of no significance for a multiplexer.

To the extent that other performance parameters are not adversely affected, it is desirable to have a wide passband width for a number of reasons. For example, in an optical network, a signal may originate from many different transmitters and then travel through many routers. Each of the transmitting lasers emitting at a channel wavelength must transmit within a given fraction of the allotted bandwidth. However, these lasers tend to drift for a number of reasons including variation in ambient temperature, aging, and other reasons. A wider passband width having a uniform insertion loss across the passband allows the lasers to drift without significantly affecting system performance. Also, a wider passband width generally reduces ripple within one channel.

The passband width depends to a large extent on the details of the design in two regions of the AWG-based optical router: the region where the input waveguide joins the input slab waveguide, and the region where the output waveguide joins the output slab waveguide. In a conventional AWG-based optical router, the width of the waveguide at the point where it joins the slab waveguide determines the size of the fundamental mode of the input/output waveguide that is supported by the input/output waveguide at the point of transition between the slab waveguide and the input/output waveguide. As a general trend, increasing the size of the fundamental mode on either the input side or the output side increases the passband width; however, the general trend has exceptions and is complicated by the fact that a portion of the optical power may propagate in modes that are of higher order than the fundamental mode. To take advantage of the general trend, the prior art describes the application of a taper 62, as illustrated in FIG. 3, comprising a input waveguide 64 that substantially increases in width as it approaches the slab waveguide 66 to which it is attached. If the taper 62 is sufficiently wide, a portion of the optical power propagates in at least one mode in addition to the fundamental mode and complications may arise, which include the possibility of introducing a local minimum in the passband and thereby adversely affecting passband ripple along with the increase in passband width, for example, as depicted in FIG. 2d. A taper region provides a transition from a first input waveguide segment 64 that is optimized for its transmission properties to a second input waveguide segment 68 that is optimized for its control of the mode size at a point 70 where it joins the slab waveguide 66. The width of the input waveguide 64 at the point 70 of attachment to the slab waveguide 66 is referred to as the taper width.

In an AWG multiplexer, the plurality of input waveguides 64 is attached to the input slab waveguide along an arc that is limited in extent by design requirements. The limited extent of this region limits input taper width. The input taper pitch is defined as distance between the centers of two adjacent tapers where they meet the slab waveguide. In the conventional AWG multiplexer, input taper pitch together with the limits of the fabrication process limits the taper width and consequently limits the size of the fundamental mode at the end of the taper. The output taper width is usually less restricted. Consequently, on a multiplexer, the output taper width is usually wider than the input taper width. Similarly, on a demultiplexer, the input taper width is usually wider than the output taper width. Increasing either or both taper widths will increase the passband width; however, increasing the disparity between the widths on the input side and the output side adversely affects the insertion loss and may adversely affect passband ripple. For a multiplexer, it is desirable to maximize the width of the fundamental mode on the input side in order to maximize the passband width without adversely affecting the insertion loss and select the mode size on the output side that provides the best trade-off between insertion loss and passband width. For the conventional multiplexer, this line of reasoning implies that the input taper widths should be as large as possible within the limits imposed by the pitch of the input tapers and the fabrication limitations. It should be emphasized that this line of reasoning is not rigorous and may not be effective in practice or may cause other performance requirements to fail; ultimately the approach requires careful experimental verification. For some multiplexers, the output taper widths should also be as large as possible within the limits imposed by the pitch of the input tapers and the fabrication limitations. A typical fabrication process may impose a gap that is between approximately 1 $\mu$m and 5 $\mu$m, resulting in a maximum taper width that is less than the input taper width by an amount that is between 1 $\mu$m and 5 $\mu$m.

One objective of the present invention is to efficiently broaden the passband width of an AWG-based optical router using a taper region. In pursuit of this objective, a taper region is described that is designed to maximize the size of the optical mode at the end of the tapers within the constraints imposed by the taper pitch and fabrication limitations. When applying this to a demultiplexer, the extent to which the passband is broadened must be balanced against the reduction in adjacent channel isolation. When applying this to a multiplexer, the adverse affect on the adjacent channel isolation is not significant. Various embodiments of this invention address these issues.

SUMMARY OF THE INVENTION

In accordance with one aspect of the present invention, there is provided an optical wavelength router that includes at least one input waveguide, an input slab waveguide, an arrayed waveguide grating, an output slab waveguide, at least one output waveguide, and at least one dendritic taper region. The input slab waveguide is optically coupled to the at least one input waveguide. The input slab waveguide and an output slab waveguide are optically coupled via the arrayed waveguide grating. The at least one output waveguide is optically coupled to the output slab waveguide. The dendritic taper region includes at least one dendritic taper. The dendritic taper includes a trunk having a first end and a second end and at least one branch optically coupled to the trunk.

In accordance with another aspect of the present invention, there is provided an optical wavelength router that includes at least one input waveguide, an input slab waveguide, an arrayed waveguide grating, an output slab waveguide, at least one output waveguide, and at least one dendritic taper region. The input slab waveguide is optically coupled to the at least one input waveguide. The arrayed waveguide grating is optically coupled to the input slab waveguide. The output slab waveguide is optically coupled to the input slab waveguide via the arrayed waveguide grating. The at least one output waveguide is optically coupled to the output slab waveguide. The at least one dendritic taper region includes at least one dendritic taper which includes a trunk having a first end and a second end. The dendritic taper includes at least one branch optically coupled to the trunk. At least one of the dendritic taper regions is an input dendritic taper region located between the at least one input waveguide and the input slab waveguide. The input dendritic taper region is optically coupled to the input slab waveguide and to the at least one input waveguide. The first end of the trunk of the input dendritic taper region is located distally from the input slab waveguide relative to the second end of the input dendritic taper region which is located proximately to input slab waveguide.

In accordance with yet another aspect of the present invention, there is provided an optical wavelength router that includes at least one input waveguide, an input slab waveguide, an arrayed waveguide grating, an output slab waveguide, at least one output waveguide, and at least one dendritic taper region. The input slab waveguide is optically coupled to the at least one input waveguide. The arrayed waveguide grating is optically coupled to the input slab waveguide. The output slab waveguide is optically coupled to the input slab waveguide via the arrayed waveguide grating. The at least one output waveguide is optically coupled to the output slab waveguide. The at least one dendritic taper region includes at least one dendritic taper which includes a trunk having a first end and a second end. The dendritic taper includes at least one branch optically coupled to the trunk. At least one of the dendritic taper regions is an output dendritic taper region located between the at least one output waveguide and the output slab waveguide. The output dendritic taper region is optically coupled to the output slab waveguide and to the at least one output waveguide. The first end of the trunk of the output dendritic taper region is located distally from the output slab waveguide relative to the second end of the output dendritic taper region which is located proximately to output slab waveguide.

In accordance with another aspect of the present invention, there is provided an optical wavelength router that includes at least one input waveguide, a slab waveguide, at least one output waveguide, and at least one dendritic taper region. The slab waveguide is optically coupled to the at least one input waveguide and to the at least one output waveguide. The slab waveguide includes an integrated reflection grating. The at least one dendritic taper region includes at least one dendritic taper that includes including a trunk having a first end and a second end. The dendritic taper includes at least one branch optically coupled to the trunk.

BRIEF DESCRIPTION OF THE DRAWINGS

The foregoing and other advantages of the invention will become apparent upon reading the following detailed description and upon reference to the drawings in which.

Figure 1:
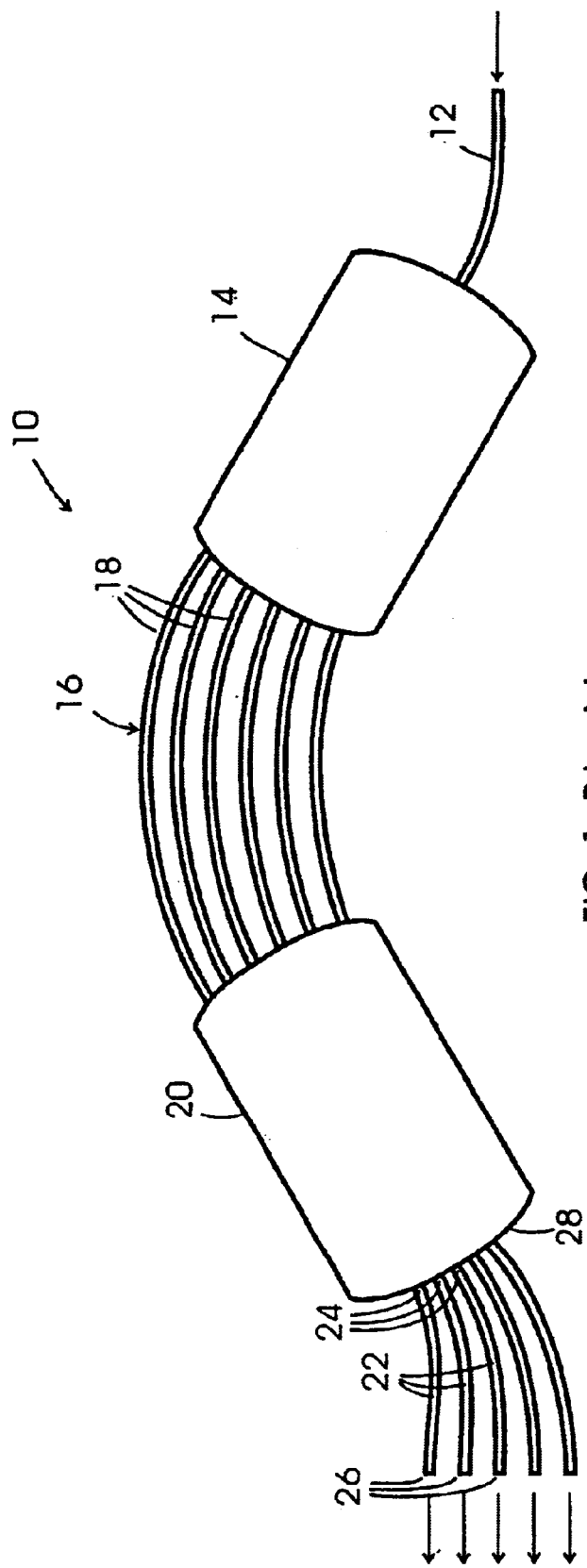
FIG. 1 is a prior art AWG demultiplexer.
Figure 2A:
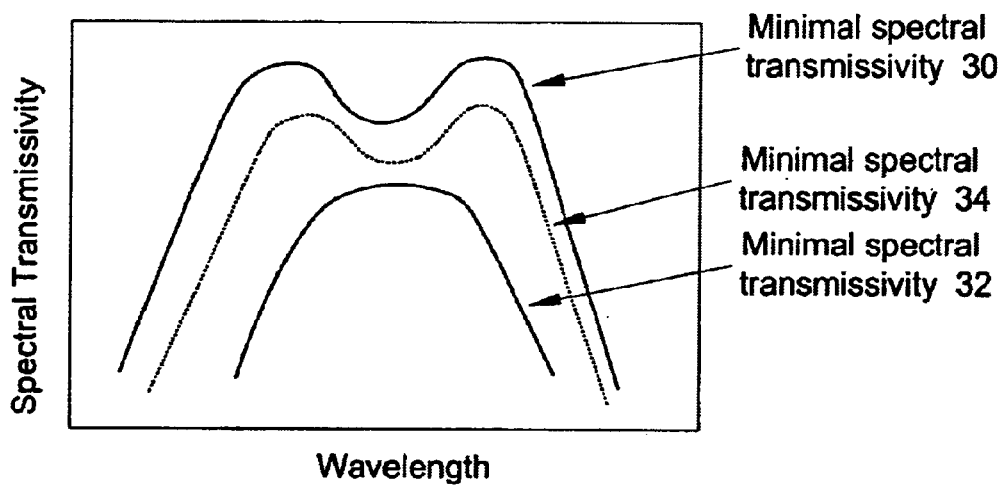
FIG. 2a is a graph of spectral transmissivity versus wavelength that illustrates the maximal, minimal, and mean spectral transmissivities for an incident polarization state.
Figure 2B:
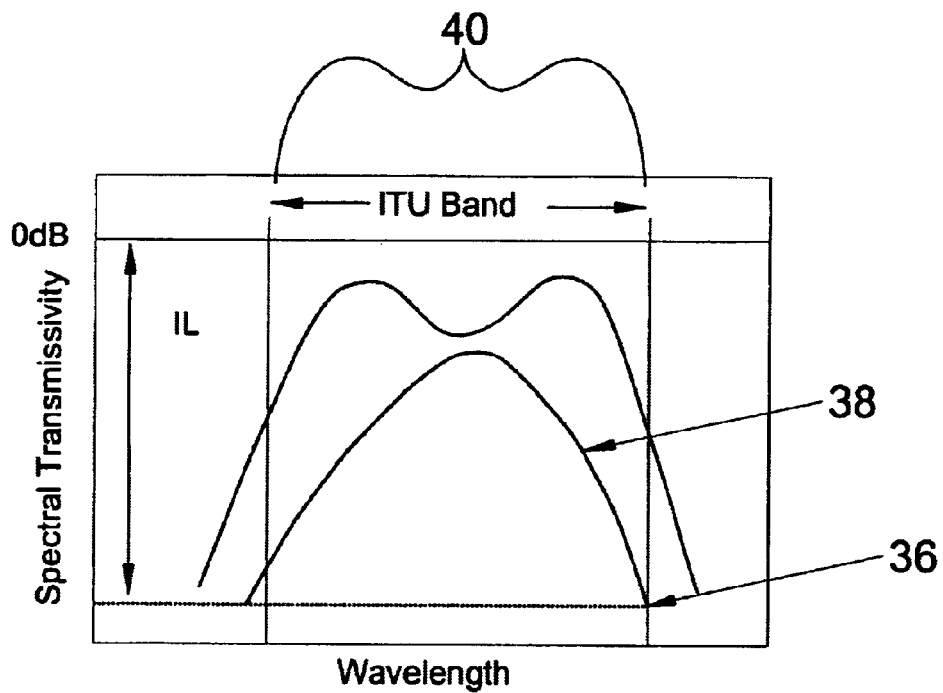
FIG. 2b is a graph of spectral transmissivity versus wavelength that illustrates the insertion loss.
Figure 2C:
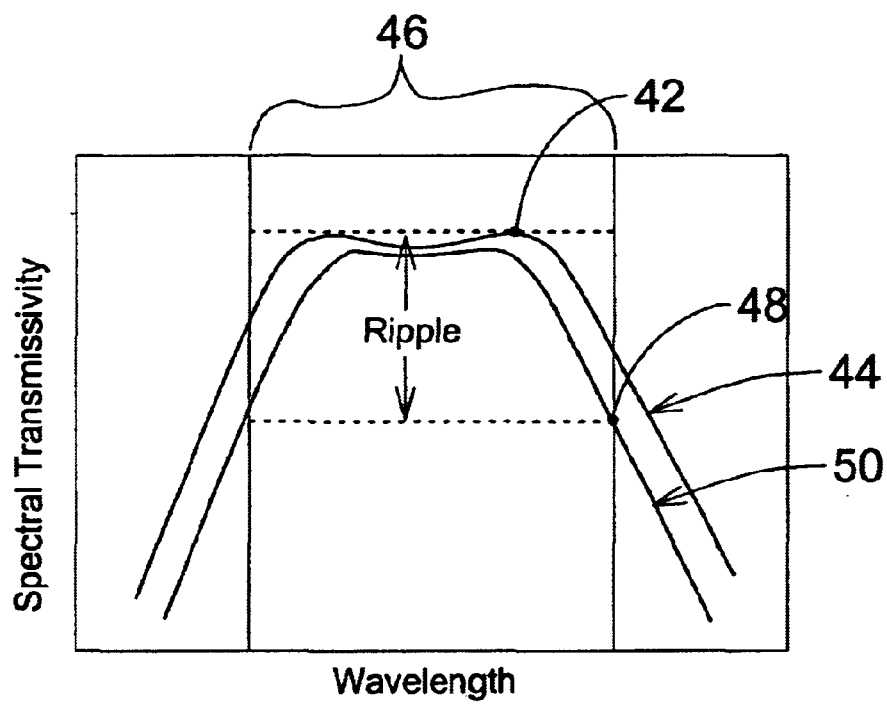
FIG. 2c is a graph of spectral transmissivity versus wavelength that illustrates ripple.
Figure 2D:
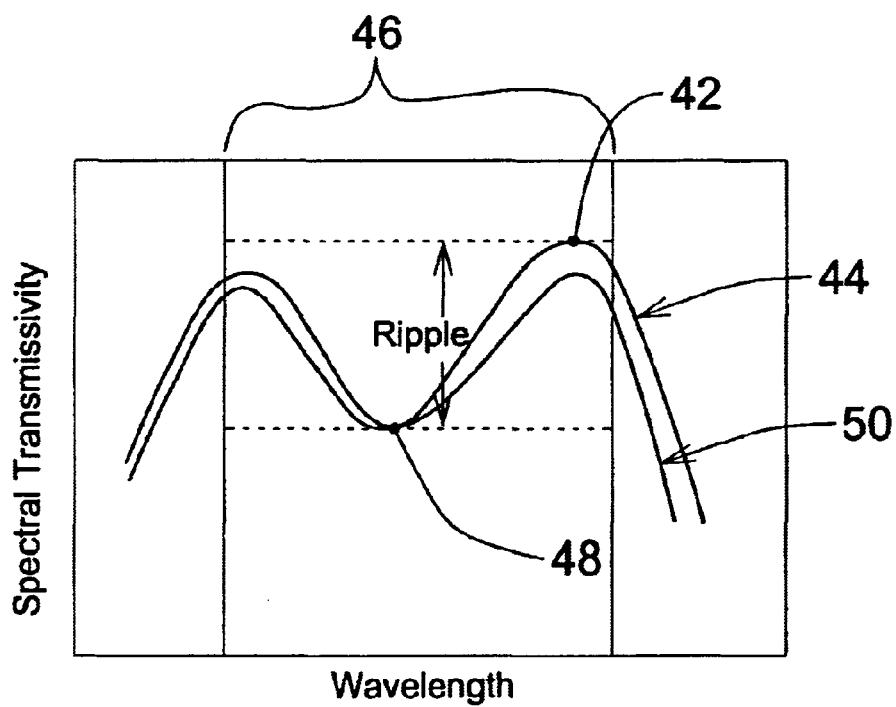
FIG. 2d is a graph of the spectral transmissivity versus wavelength that further illustrates ripple.
Figure 2E:
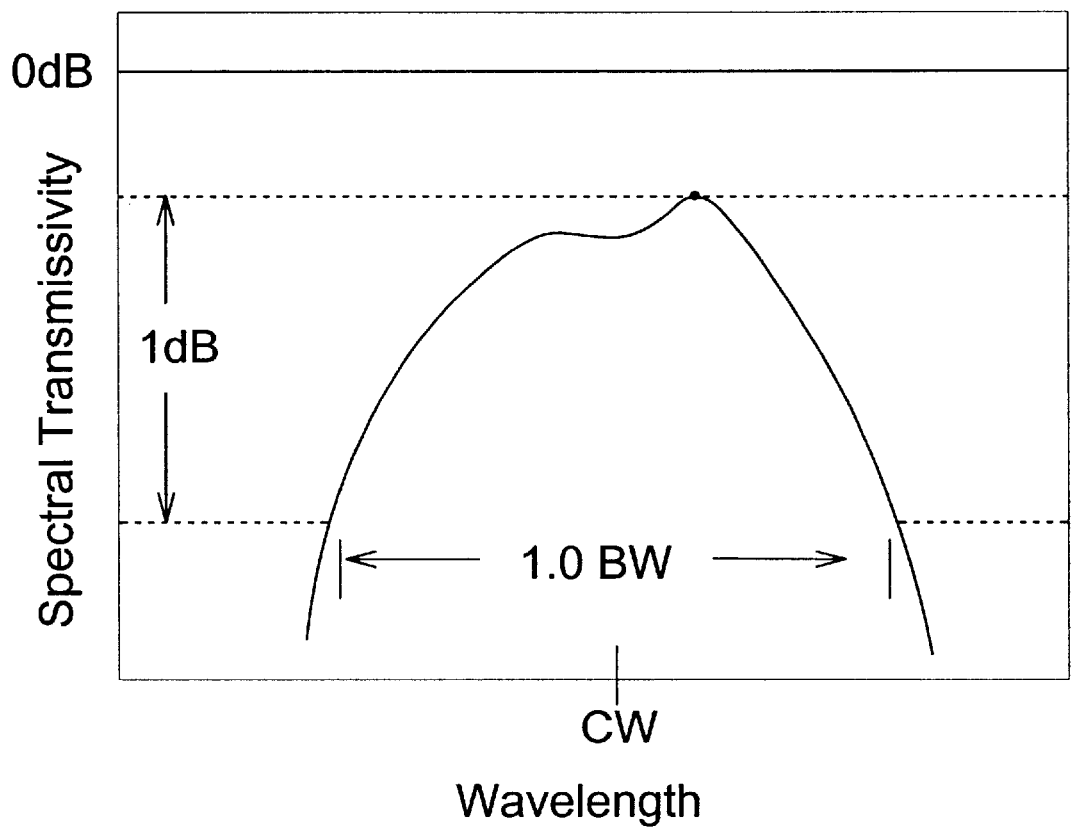
FIG. 2e is a graph of spectral transmissivity versus wavelength that illustrates the passband width with respect to the −1 dB insertion loss reference level.
Figure 2F:
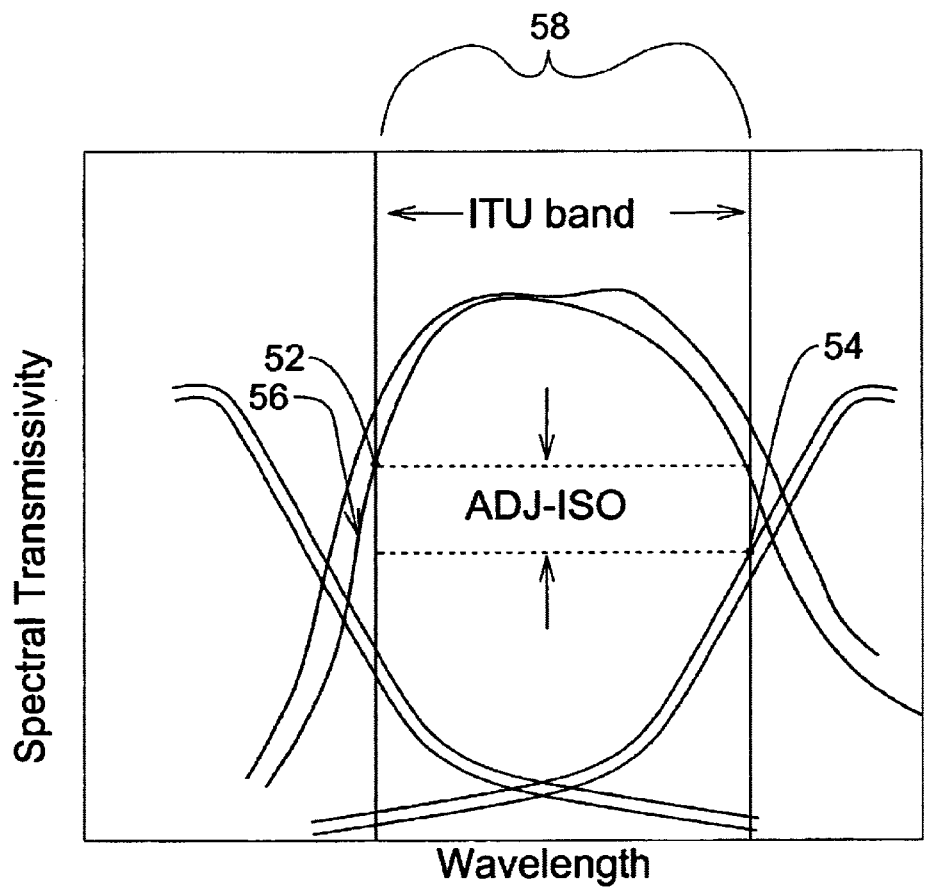
FIG. 2f is a graph of spectral transmissivity versus wavelength that illustrates the adjacent isolation.
Figure 3:
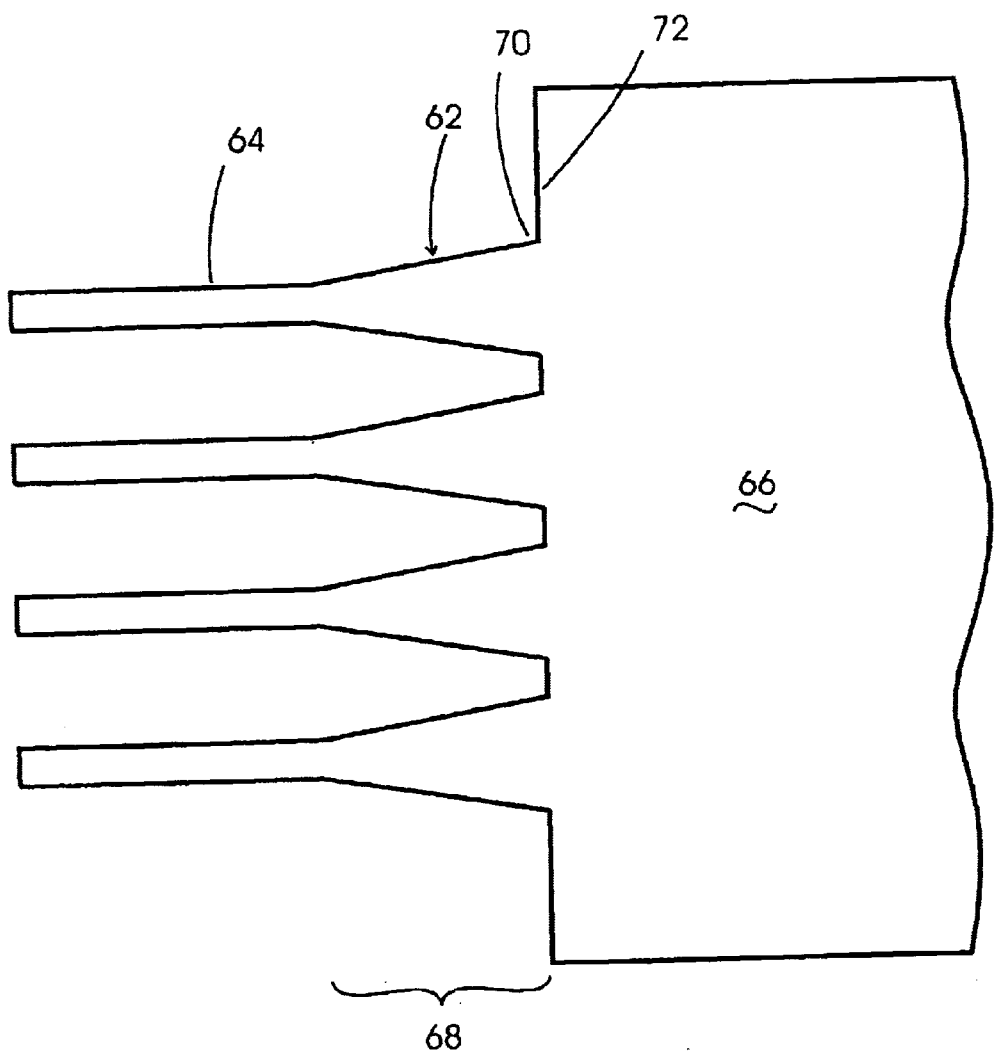
FIG. 3 is a prior art input taper array.

While the invention is susceptible to various modifications and alternative forms, specific variations have been shown by way of example in the drawings and will be described herein. However, it should be understood that the invention is not limited to the particular forms disclosed. Rather, the invention is to cover all modifications, equivalents, and alternatives falling within the spirit and scope of the invention as defined by the appended claims.

DETAILED DESCRIPTION

Figure 4:
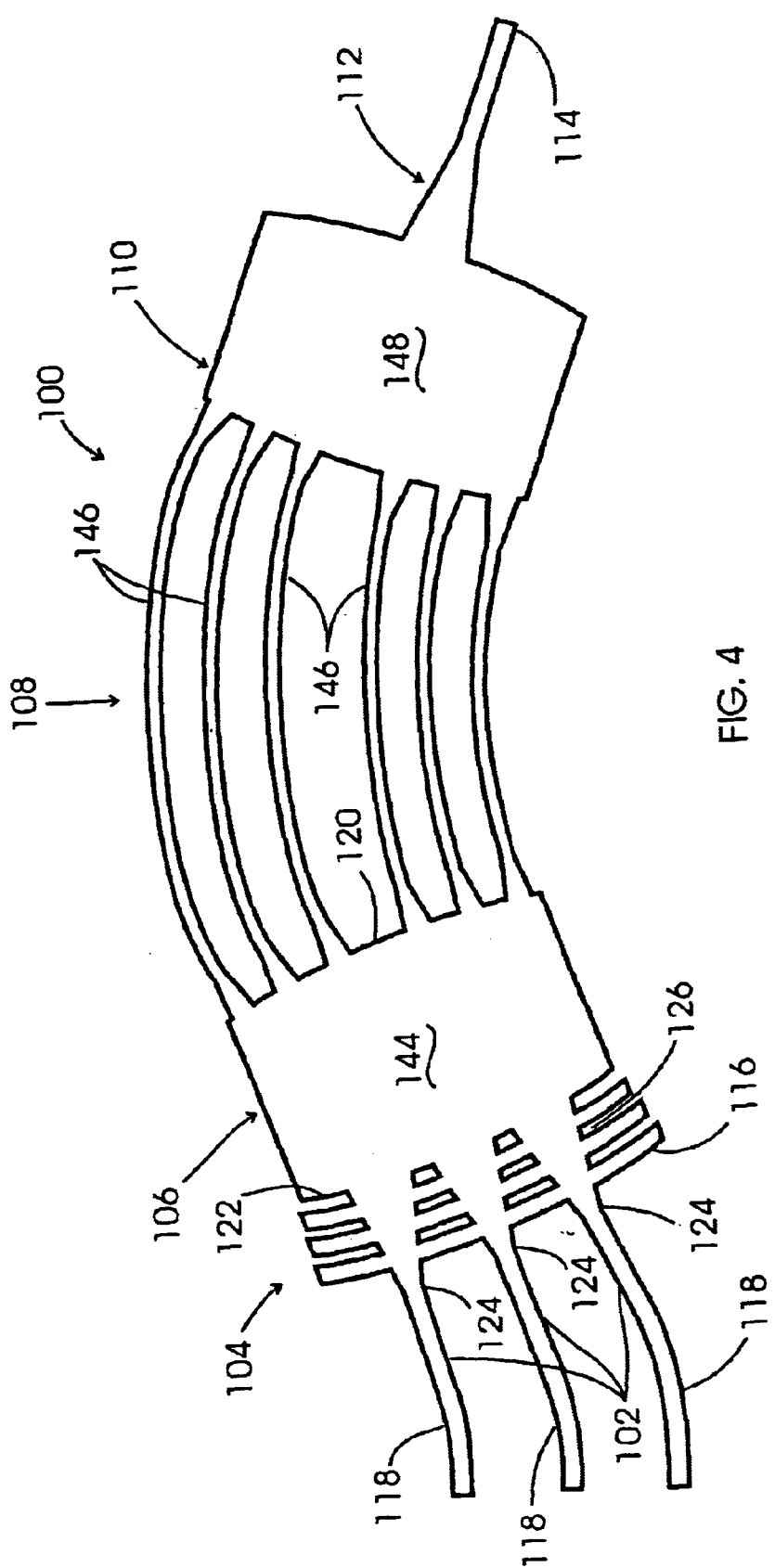
FIG. 4 is a multiplexer with a dendritic input taper region of the present invention.

Turning now to the drawings and referring initially to FIG. 4, there is depicted an AWG multiplexer 100. Multiplexer 100 includes a plurality of input waveguides 102, a dendritic input taper region 104, an input slab waveguide 106, an arrayed waveguide grating (AWG) 108, an output slab waveguide 110, a conventional output taper region 112, and at least one output waveguide 114. As shown in FIG. 4, the input waveguides 102 are optically coupled to the input slab waveguide 106 via the dendritic input taper region 104. The input slab waveguide 106 and the output slab waveguide 110 are optically coupled via an AWG 108. The output waveguides 114 are optically coupled to the output slab waveguide 110 via the output taper region 112. The input/output slab waveguides 106, 110 and the input/output waveguides 102, 114 along with branches or strips 116 of the input dendritic taper region are comprised of substantially the same material.

In a typical embodiment, the slab waveguides 106 and 110 are comprised of at least three layers of doped silica deposited on a silicon wafer, namely, a bottom cladding layer that is approximately 5 $\mu$m to approximately 50 $\mu$m thick, a core layer that is approximately 5 $\mu$m to approximately 12 $\mu$m thick and a top cladding layer that is approximately 5 $\mu$m to approximately 50 $\mu$m thick. In a typical embodiment the core layer typically has a refractive index that is larger than the refractive index of the bottom cladding by approximately between 0.02 and 0.2 and the refractive index of the bottom cladding is approximately between 1.4 and 2.2 as measured in the wavelength range between 1520 nm and 1600 nm. However, the invention is not so limited and may be applied to integrated optical routers comprising waveguides that are comprised of other materials such as InGaAsP, silicon, or polymer. Furthermore, the slab waveguide may comprise more than three optical layers or may comprise a graded index layer. In the preferred embodiment, the input/output slab waveguides and/or the input/output waveguides are single mode waveguides, i.e., only the fundamental mode is guided by the waveguide.

The input waveguides 102 direct optical power from input fibers (not shown) in a direction determined by the physical boundaries of the input waveguides 102. In the preferred embodiment, the input waveguides 102 are approximately between 5 μm and 15 μm wide, and approximately between 5 μm and 12 μm thick and generally rectangular in cross-section. The input waveguides 102 are etched such that the plurality of input waveguides 102 form a slight bend 118, that is preferably slightly S-shaped, before contacting the input taper region 104. Each S-bend 118 changes the direction of propagation of the light from a direction that is parallel to the fiber from which the light came to a direction that points to a focal point near a boundary 120 of the input slab waveguide 106 that is opposite the boundary 122 at which the input taper region 104 is attached. The S-bends 118 also decrease the separation of the input waveguides 102 from a typical separation of either approximately 127 μm or 250 μm at the location where the input waveguides 102 couple to the input fibers (not shown), to a separation typically between approximately 5 μm and 50 μm at a location 124 where they couple to the input taper region 104. Also, the input waveguides 102 are substantially radially positioned along the input slab waveguide 106 such that they are radially directed toward a focal point located near the opposite side of the input slab waveguide 106. The input waveguides 102 are optically coupled to the dendritic input taper region 104 and optical power is transmitted from the input waveguides 102 into the dendritic input taper region 104.

Figure 5:
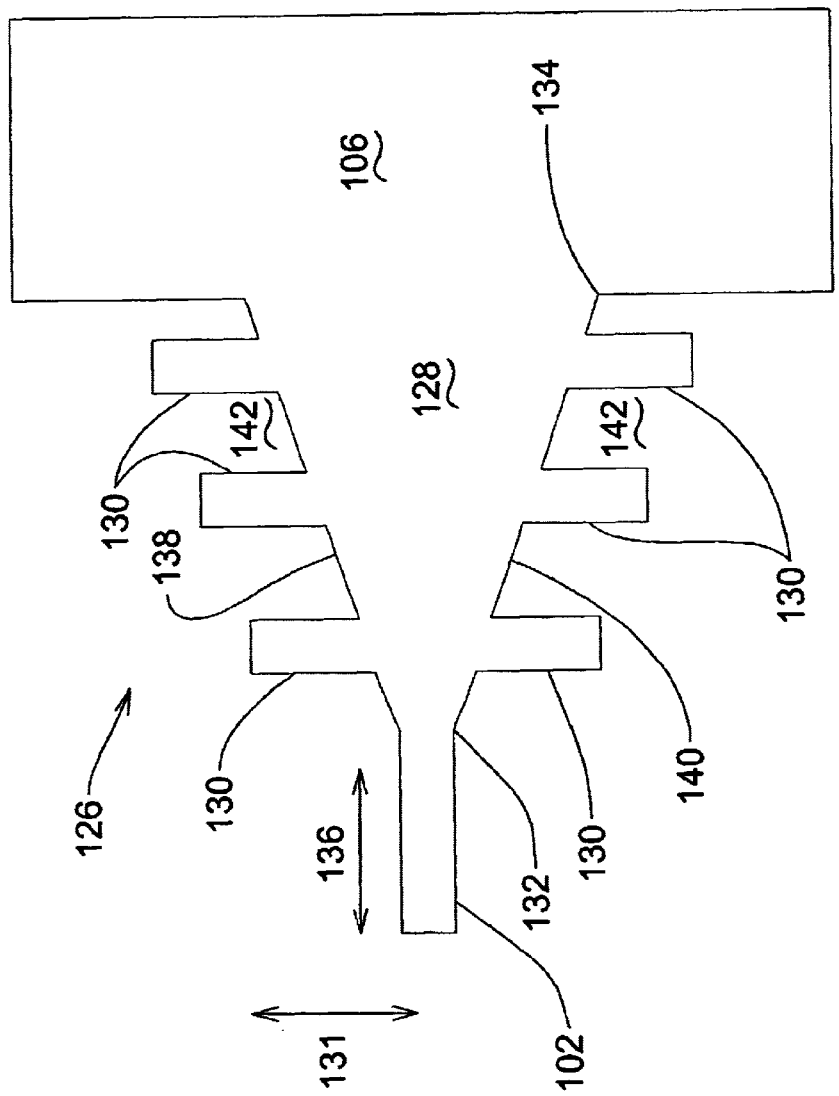
FIG. 5 is a dendritic taper of the present invention.

The dendritic input taper region 104 comprises at least one dendritic input taper 126. An illustrative example of a dendritic input taper 126 of this invention is depicted in FIG. 5. The illustrated taper 126 comprises a first region 128, which is herein referred to as the trunk 128 of the taper 126, and a plurality of additional segments 130, which herein are referred to as the branches 130 of the taper 126. In a typical embodiment of the present invention, the trunk 128 of the taper 126 is between approximately 5 μm to 10 μm wide in a transverse direction 131 at a first end 132 and between approximately 5 μm and 50 μm wide at a second end 134. In the typical embodiment, the second end 134 of the trunk 128, which is wider than the first end 132, is attached to the input slab waveguide 106. In the typical embodiment, the distance between the first end 132 and the second end 134 is the length of the taper 126 and extends between approximately 100 μm and 1000 μm in a longitudinal direction 136. In the typical embodiment, as the distance from the first end 132 of the taper 126 increases in the longitudinal direction 136, the width of the trunk 128 increases smoothly and monotonically. The width of the trunk 128 may monotonically increase or decrease at a rate that does not exceed approximately 2 μm of transverse width per 1 μm of longitudinal distance progressed. The trunk 128 includes a first side or boundary 138 and second side or boundary 140 that confine the trunk 128 in the transverse direction 131.

In the present invention, at least one side, and typically both sides 138, 140, of the trunk 128 have a plurality of branches 130 attached. For clarity, FIG. 4 illustrates three branches 130 on each side 138, 140 of the trunk 128; however, the preferred embodiment has approximately 10 to 15 branches 130 on each of the sides 138, 140 of the trunk 128. The branches 130 comprise core material that remains in the plane of the PLC and extend outward from the trunk 128. Typically, the branches 130 extend outward only in the transverse direction 131 and, consequently, extend in a direction that is generally perpendicular to the longitudinal direction 136 of the trunk 128 of the taper 126. Other angles of extension relative to the trunk 128 are also within the scope of this invention. The widths of the branches 130 are typically less than approximately 50 μm in the longitudinal direction 136. Gaps 142 between branches 130 comprise side cladding material and are typically less than approximately 50 μm in the longitudinal direction 136. Typically, the branches 130 extend more than approximately 1 μm in the transverse direction 131; however, the invention is not so limited and the branches 130 could extend further. Because the trunk 128 and branches 130 of the present invention resemble structures on a tree, this invention is referred to herein as a dendritic taper.

The number, spacing and size of the branches of the dendritic taper affect the optical properties of the taper. By selecting appropriate values for the number, spacing and size of the branches 130, a dendritic taper can be designed with optical properties that perform better than conventional non-dendritic tapers. The transverse limits of the trunks 128 of the dendritic tapers 126 along with the branches 130 of the dendritic tapers 126 are defined in a process that is substantially the same as the process for the fabrication of the waveguides.

In an alternative embodiment of this invention, the width of the trunk 128 is constant throughout the length of the taper 126. In yet another embodiment, the width of the trunk 128 is smaller at the second end 134 of the taper 126 than it is at the first end 132 of the taper 126. In yet another embodiment, the width of the trunk 128 of the taper 126 changes non-monotonically.

Figure 6:
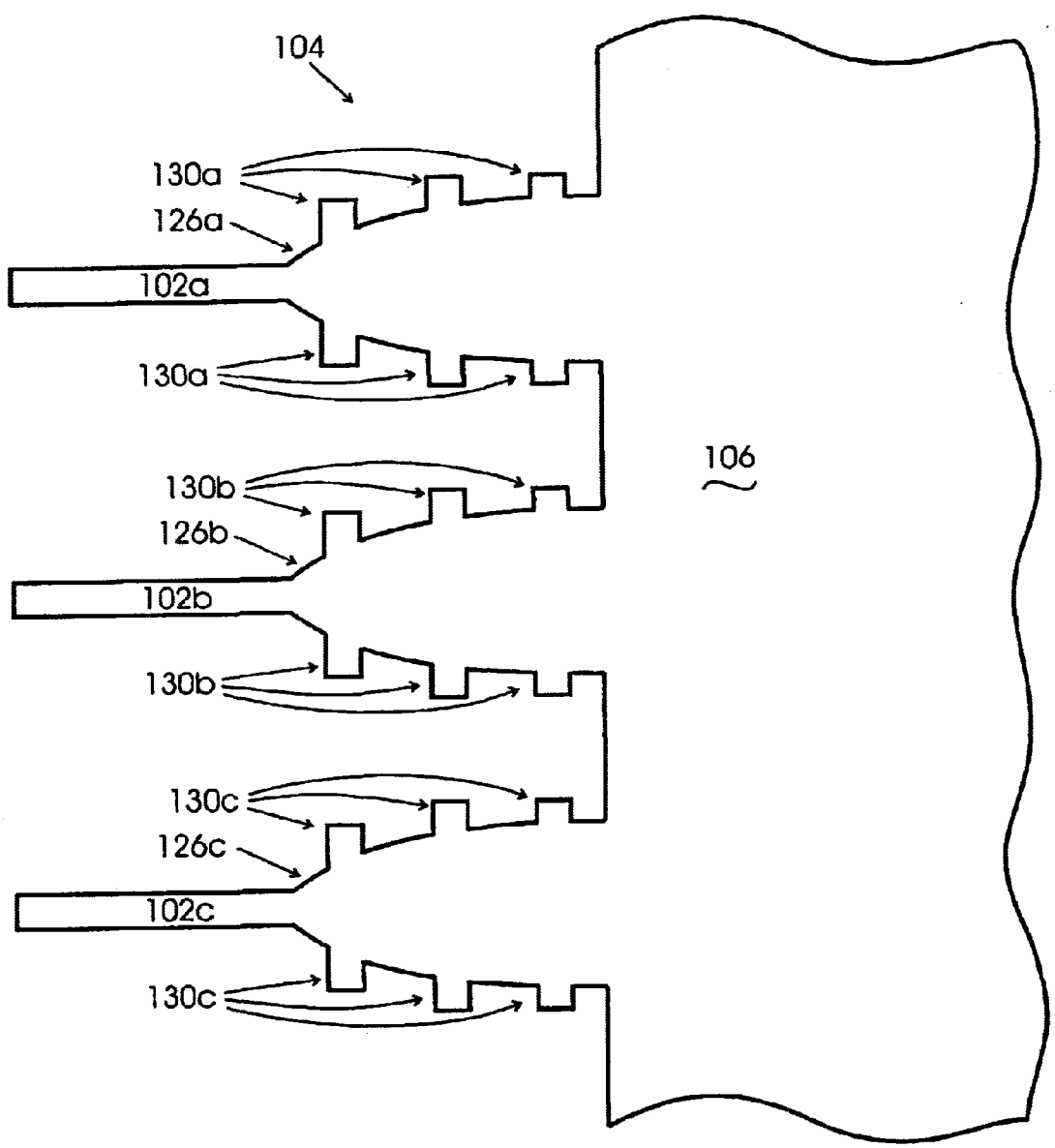
FIG. 6 is a dendritic taper region of the present invention.

Referring to FIG. 6, for non-limiting illustrative purposes, there is depicted a dendritic taper region 104 showing three dendritic tapers 126a, 126b, and 126c each having an associated input waveguide 102a, 102b, and 102c, respectively. In this embodiment, branches 130a, 130b, and 130c of each dendritic taper 126a, 126b, 126c, respectively, do not interconnect. For example, the branches 130a of dendritic taper 126a do not interconnect with the branches 130b of dendritic taper 126b where dendritic taper 126a is adjacent to dendritic taper 126b. The branches 130b of dendritic taper 126b do not interconnect with the branches 130a or branches 130c of dendritic tapers 126a and 126c, respectively.

Figure 7:
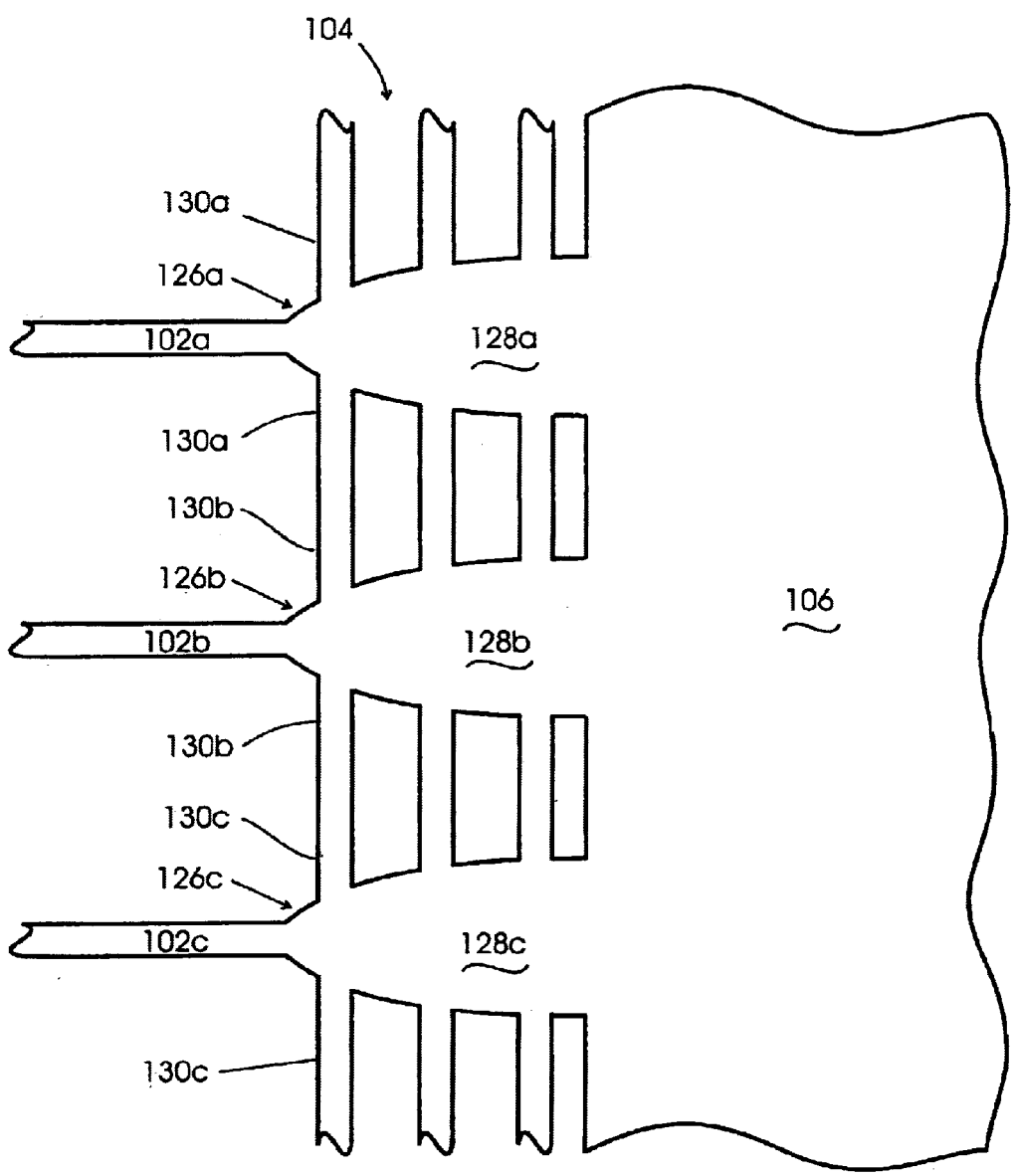
FIG. 7 is a dendritic taper region of the present invention.

Alternatively, referring to FIG. 7, for non-limiting illustrative purposes, there is depicted a dendritic taper region 104 showing three dendritic tapers 126a, 126b, and 126c each having an associated input waveguide 102a, 102b, and 102c, respectively. In this embodiment, branches 130a, 130b, and 130c of adjacent dendritic tapers 126a, 126b, and 126c interconnect. For example, branches 130a of dendritic taper 126a interconnect with the branches 130b of adjacent dendritic taper 126b; and branches 130b of dendritic taper 126b interconnect with branches 130a and 130c of adjacent dendritic tapers 126a and 126c, respectively; and branches 130c of dendritic taper 126c interconnect with branches 130b of adjacent dendritic taper 126b. The embodiment depicted by this figure is preferred over the embodiment depicted by FIG. 6. In this embodiment, the plurality of branches 130a, 130b, and 130c may also be described as a plurality of strips of core material that intersect trunks 128a, 128b, and 128c of the tapers 126a, 126b, and 126c, respectively.

Figure 8:
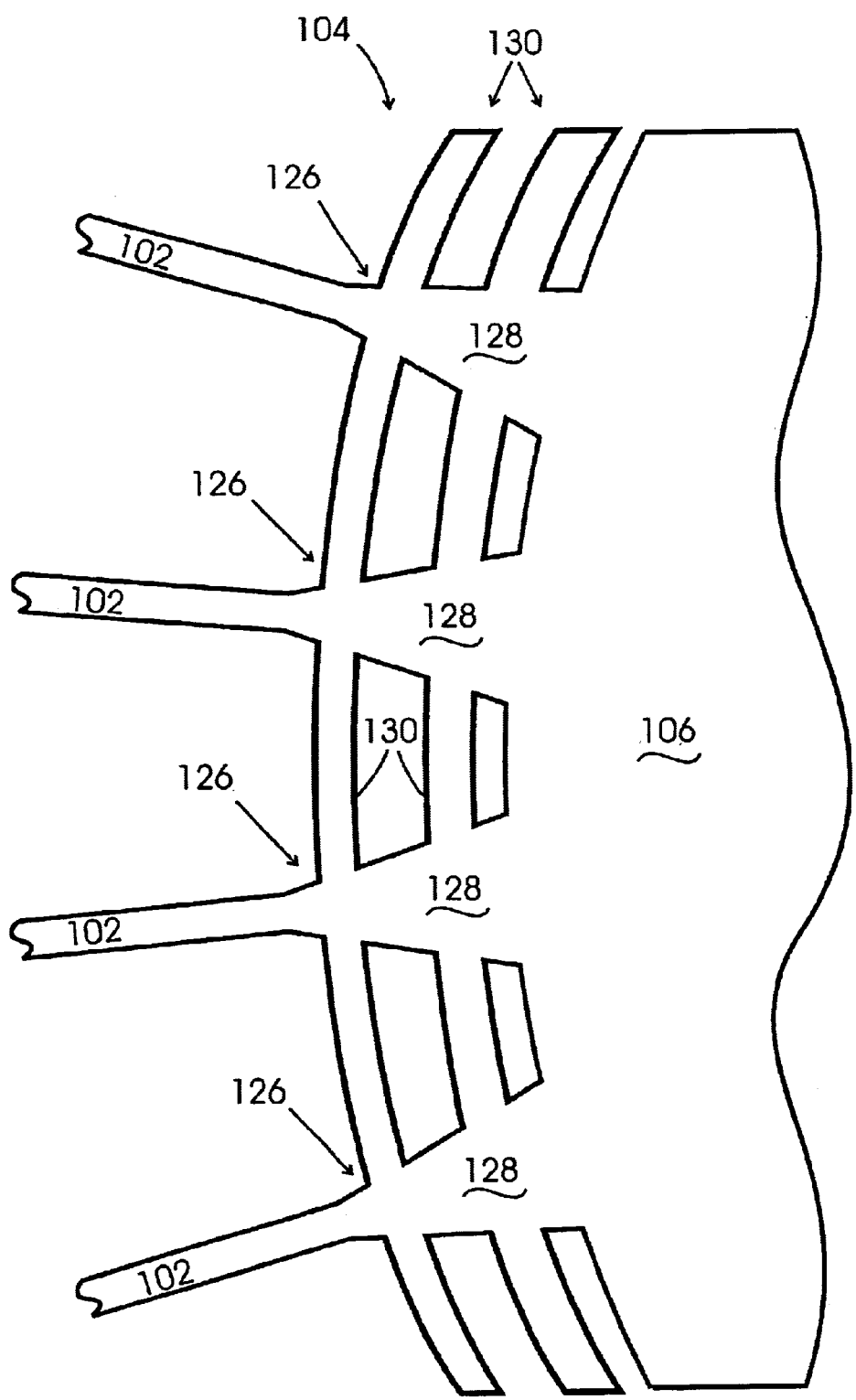
FIG. 8 is a dendritic taper region of the present invention.

In FIG. 8, there is depicted, for non-limiting illustrative purposes, a dendritic taper region 104 comprising five dendritic tapers 126 of this invention. In this embodiment, the plurality of branches 130 may also be described as a plurality of strips 130 of core material that traverse the trunks 128 of the tapers 126. The strips 130 that traverse the core may be curved to accommodate trunks 128 that are not parallel to each other and still optimally traverse each trunk 128. The input dendritic taper region 104 includes a plurality of branches 130 that are so arranged as to from generally parallel strips 130 that substantially transversely intersect the trunks 128 to form a dendritic taper structure 104. Since the trunks 128 of the tapers 126 are radially positioned along the input slab waveguide 106, the strips 130 are slightly curved such that they are substantially perpendicular to the radially directed input waveguides 12 as exaggerated in FIG. 8.

Figure 9:
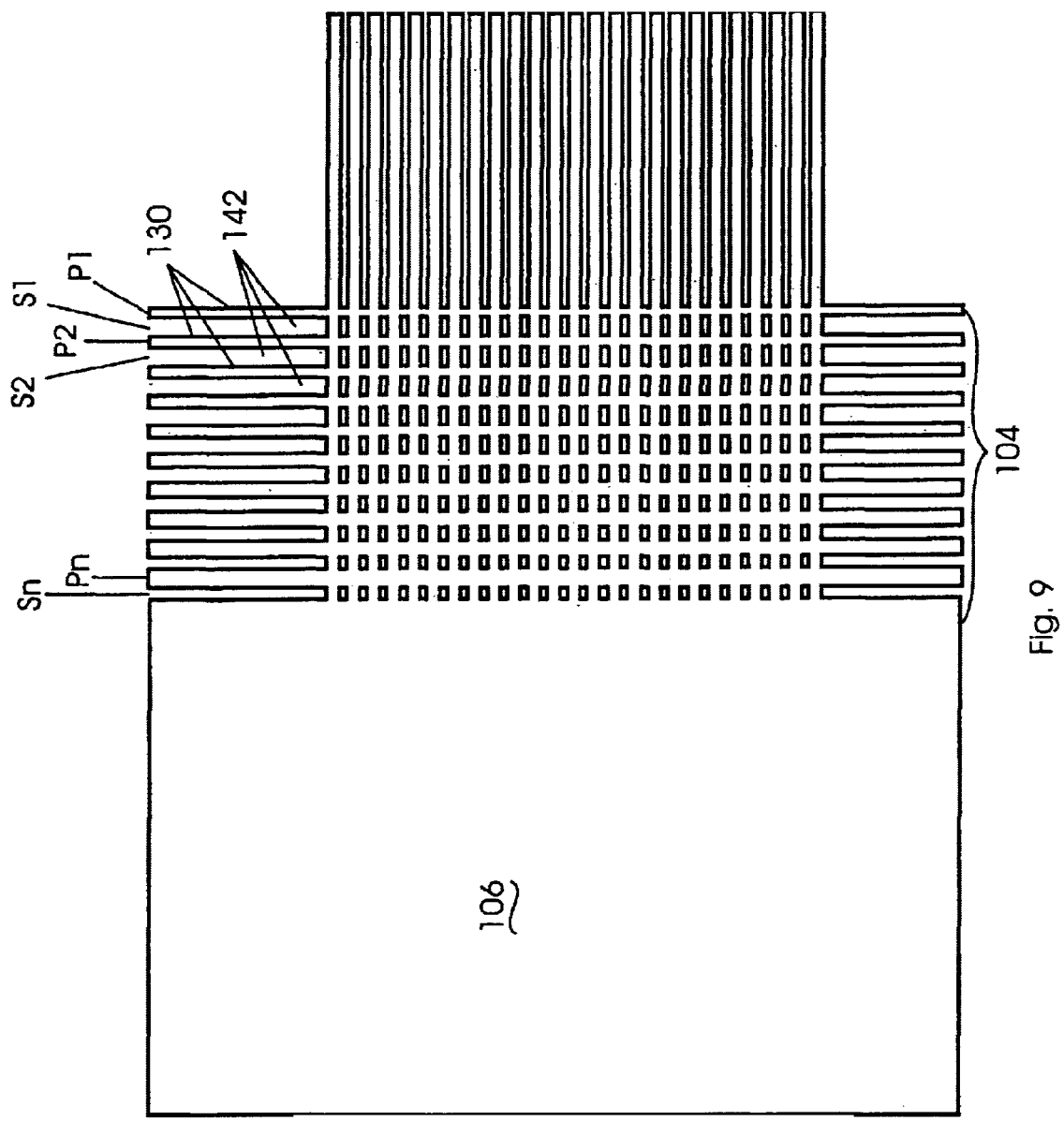
FIG. 9 is a dendritic taper region of the present invention.

Turning now to FIG. 9, the dendritic input taper region 104 is illustrated with a greater number of strips 130, which are denoted by $p_1$, $p_2$, $p_3$, . . . $p_n$. The strips 130 are progressively wider with distance towards the input slab waveguide 106. In the variation shown in FIG. 9, n strips 130 are shown. In one variation, the strips 130 range in width from approximately 4.0 μm to approximately (n+3) μm with the narrowest strip, $p_1$, being located distally relative to the input slab waveguide 106 and the widest strip, $p_n$, being located proximately relative to the input slab waveguide 106. In the preferred embodiment, the narrowest strip has a width that is equal to the smallest width that can be reliably fabricated with the particular fabrication process that is available for the manufacture of the device.

Separation gaps 142 are defined between the strips 130 and between the input slab waveguide 106 and the strip, $p_n$, that is closest to the input slab waveguide. These gaps 142 and are denoted by $s_1$, $s_2$, $s_3$, . . . $s_n$. The separation gaps 142 are progressively narrower with distance towards the input slab waveguide 106. In the variation shown in FIG. 9, n separation gaps 142 are shown. The width of the separation gaps 142 ranges from approximately 4.0 μm to (n+3) μm with the narrowest separation gap, $s_n$, being located proximately relative to the input slab waveguide 106 and the widest separation gap, $s_1$, being located distally relative to the input slab waveguide 106. In the variation shown in FIG. 9, the narrowest gap is approximately 4.0 μm wide. In a preferred embodiment, the narrowest gap has a width that is equal to the smallest gap that that can be reliably fabricated with the particular fabrication process that is available for the manufacture of the device.

In one embodiment, the width of a single strip, $w(p_n)$ of the input dendritic taper region 104 and the width of its adjacent input separation gap, $w(s_n)$ have a sum equal to a combined width that is a constant, $\Lambda_i$, that can be mathematically expressed as follows:

$$\Lambda_i = w(p_n) + w(s_n)$$

As shown above, $w(p_n)$ increases as the strips, $p_1$, $p_2$, $p_3$, . . . $p_n$, become progressively closer to the input slab waveguide 106. In one variation, the period $\Lambda_i$ is approximately 20 μm. The widths of strips, $p_1$, $p_2$, $p_3$, . . . $p_n$, increase linearly such that the widths of the strips, $p_1$, $p_2$, $p_3$, . . . $p_n$, are 4 μm, 5 μm, 6 μm, 7 μm, 8 μm, 9 μm . . . (n+3) μm, respectively. Accordingly, the widths of the separation gaps, $s_1$, $s_2$, $s_3$, . . . $s_n$, decrease linearly such that the widths of the separation gaps, $s_1$, $s_2$, $s_3$, . . . $s_n$, are (n+3) μm, (n+2) μm, . . . 4 μm, respectively. This arrangement of strip widths and gap widths is one method of making the transition gradual, which is important for minimizing the extent to which optical radiation emerges out of the sides of the taper. However, the invention is not so limited and a number of variations are possible such that the widths of the strips 130 generally increase with distance towards the input slab waveguide 106 and/or the widths of the separation gaps 142 generally decrease with distance towards the input slab waveguide 106. For example, the widths of the separation gaps 142 may be constant and the widths of the strips 130 increase with distance towards the input slab waveguide 106. Alternatively, the widths of the strips 130 may be constant and the widths of the separation gaps 142 decrease with distance towards the input slab waveguide 106. Furthermore, $\Lambda_i$ does not need to be a constant and the widths need not vary linearly. For example, if $\Lambda_i$ is a constant, then the ratio of the strip width $w(p_n)$ to the period Ai can be viewed as a duty cycle. The duty cycle $w(p_n)/\Lambda_i$ can be related to the distance from the input slab waveguide 106 by a number of functional relationships including, but not limited to, raised cosine, linear, and parabolic. The construction of the input dendritic taper region 104 can be varied to tailor the spectral profile.

Figure 10:
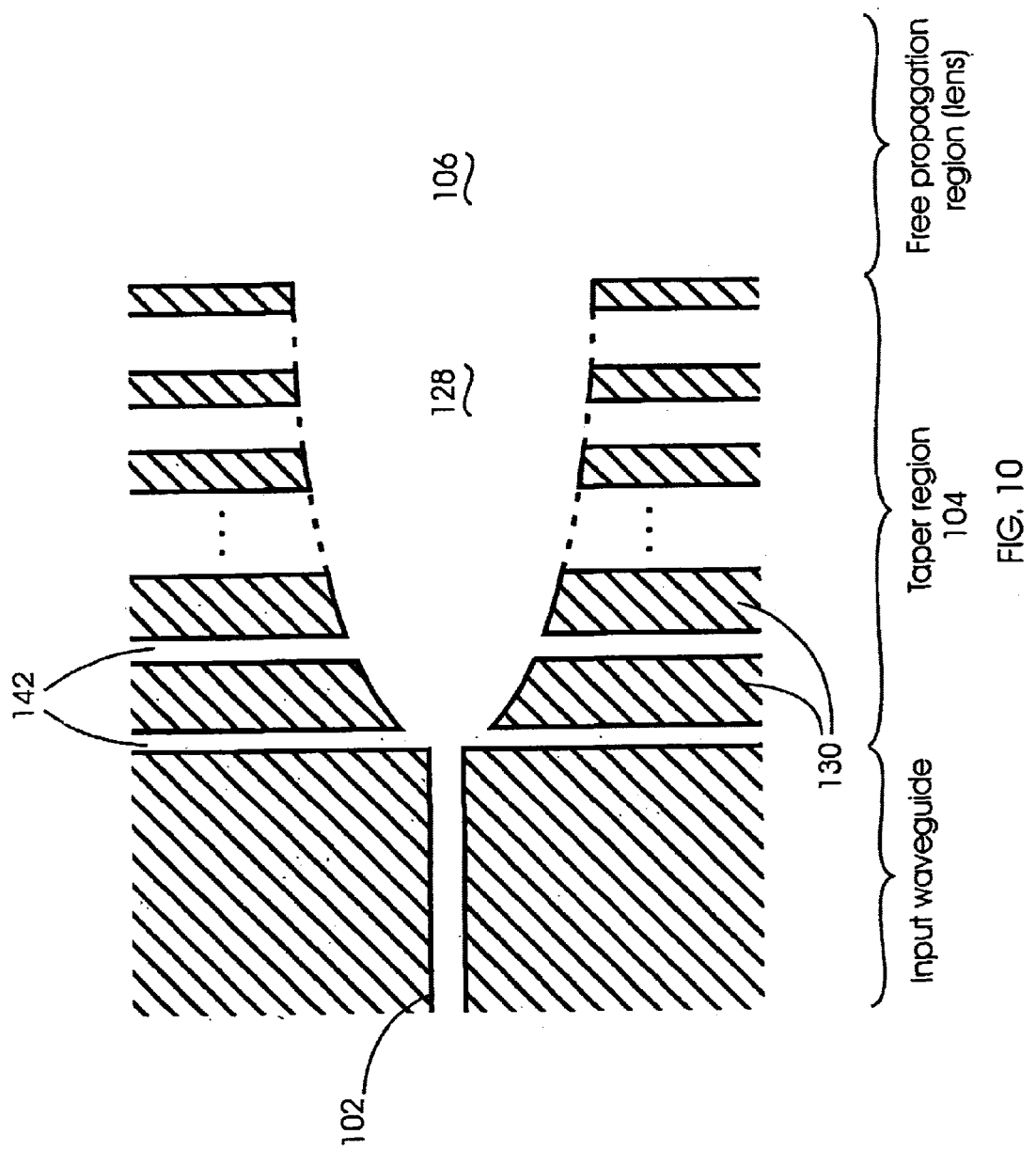
FIG. 10 is a dendritic taper with a parabolic taper of the present invention.

The trunks 128 are tapered using a gradual linear taper such that the trunks 128 widen towards the input slab waveguide 106. The trunks 128 range in width from between approximately 5 μm and 10 μm at the first end 132 to approximately between 5 and 50 μm at a second end 134. Although the taper is shown to be linear, the invention is not so limited. For example, the taper may be parabolic as shown in FIG. 10. Also, a vertical taper may be employed in the input taper region 104. A vertical taper generally involves adding a second high-index layer over the trunks 128.

As shown in FIG. 4, optical power entering the input slab waveguide 106 from the dendritic input taper region 104 is conveyed to the arrayed waveguide grating 108. The input slab waveguide 106 includes a free propagation region 144 defined between the dendritic input taper region 104 and the arrayed waveguide grating 108. The input slab waveguide 106 is between approximately 5 mm and 20 mm in length and is typically formed as a planar slab of low-loss dielectric or other material having an index of refraction that is approximately 1.4 to approximately 2.2. Optical power transmitted across the input slab waveguide 106 is distributed to the AWG 108.

The AWG 108 separates the individual wavelengths of light and diffracts each in a slightly different direction. To achieve a grating function, the AWG 108 includes a plurality of unequal length waveguides 146. Each unequal length waveguide 146 in the AWG 108 differs in length from its neighboring waveguide 146 by a predetermined amount. Optical power from the AWG 108 is transmitted to the output slab waveguide 110.

The output slab waveguide 110 includes a free propagation region 148 generally defined between the AWG 108 and the output taper region 112. Similarly to the input slab waveguide 106, the output slab waveguide 110 is between approximately 5 mm and 20 mm in length and typically formed as a planar slab of low-loss dielectric or other material having an index of refraction that is substantially the same as the input slab waveguide. Optical power from the output slab waveguide 110 is transmitted to the output taper region 112.

Figure 11:
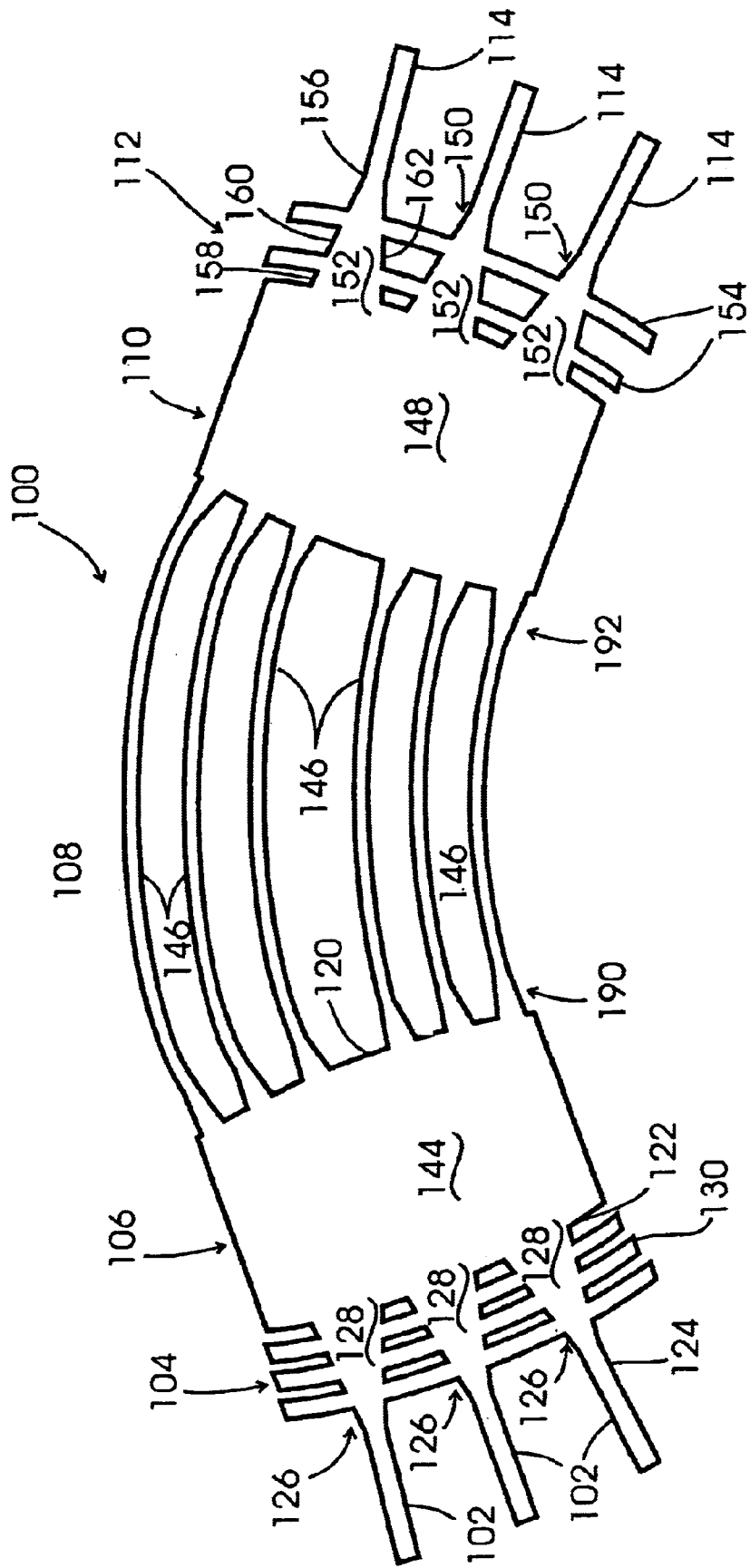
FIG. 11 is a multiplexer with a dendritic input taper region and a dendritic output taper region of the present invention.

The output taper region 112 may include at least one conventional taper as shown in FIG. 4 or, alternatively, it may include at least one a dendritic taper as shown in FIG. 11. If a dendritic taper is used for the output taper region 112, the preferred embodiment of the output dendritic taper region 112 is understood to be consistent with the embodiments of the input dendritic taper region 104 described above such that the word "output" may replace the word "input" in the above description of the dendritic input region 104. However, variations between the input dendritic taper region 104 and the output dendritic taper region 112 may be evident in the number of strips or in the dimensions of various features provided that the dimensions of the features are within ranges described above for the dendritic input taper region 104.

As shown in FIG. 11, the dendritic output taper region 112 comprises at least one dendritic output taper 150. The dendritic output taper 150 of this invention is substantially similar to the dendritic input taper 126 depicted in FIG. 5. The dendritic output taper 150 comprises a trunk 152, and a plurality of segments or branches 154. In a typical embodiment of the present invention, the trunk 152 of the taper 150 is between approximately 5 $\mu$m and 10 $\mu$m wide in a transverse direction at a first end 156 and between approximately 5 $\mu$m and 50 $\mu$m wide at a second end 158. In the typical embodiment, the second end 158 of the trunk 152, which is wider than the first end 156, is attached to the output slab waveguide 110. In the typical embodiment, the distance between the first end 156 and the second end 158 is the length of the taper 150 and extends between approximately 100 $\mu$m and 1000 $\mu$m in a longitudinal direction. In the typical embodiment, as the distance from the first end 156 of the taper 152 towards the second end 158 increases in the longitudinal direction, the width of the trunk 152 increases smoothly and monotonically, and increases at a rate that does not exceed approximately 2 $\mu$m of transverse width per 1 $\mu$m of longitudinal distance progressed. The trunk 152 includes a first side or boundary 160 and second side or boundary 162 that confine the trunk 152 in the transverse direction. In particular, the width of the trunks 152 of the output tapers 150 may be wider than the widths of the input tapers 126; however, in the preferred embodiments both the input taper widths and the output taper widths are approximately between 5 $\mu$m and 50 $\mu$m.

The PLC of FIGS. 4–11 has been described as a multiplexer with input optical signals, each at a different wavelength, entering the multiplexer from separate input fibers, and being combined into one output fiber. The invention has been described as a multiplexer having a dendritic input taper region 104 and an output taper region 112 that may comprise at least one dendritic taper 150 or a conventional taper; however, the invention is not so limited. The invention also applies to a multiplexer with a conventional input taper region and a dendritic output taper region. The invention also applies to a demultiplexer with a dendritic taper array for the output taper region and/or a dendritic taper array for the input taper region. The invention applies more generally to an AWG optical wavelength router. The invention also applies to an integrated reflection grating optical router.

Figure 12:
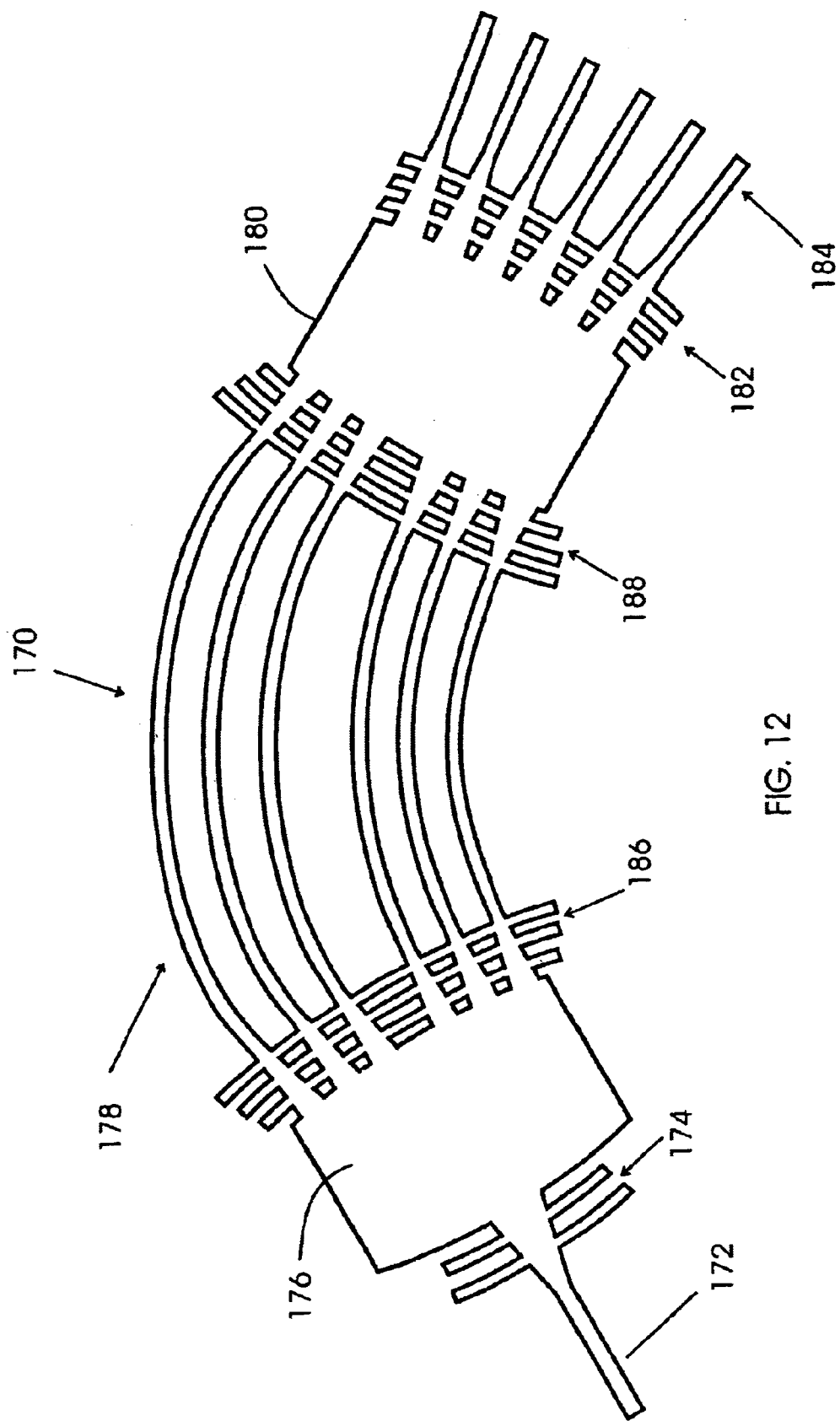
FIG. 12 is a demultiplexer with a dendritic input taper region, a dendritic output taper region, a dendritic first AWG taper array region and a dendritic second AWG taper array region of the present invention.

A demultiplexer 170 is shown in FIG. 12. The demultiplexer 170 includes at least one input waveguide 172, an input taper region 174, an input slab waveguide 176, an arrayed waveguide grating (AWG) 178, an output slab waveguide 180, an output taper region 182, and a plurality of output waveguides 184. The input waveguides 172 are optically coupled to the input slab waveguide 176 via the input taper region 174. The input slab waveguide 176 and the output slab waveguide 180 are optically coupled by the AWG 178. The output waveguides 184 are optically coupled to the output slab waveguide 180 via the output taper region 182. The demultiplexer 170 separates numerous input optical signals, each at a different wavelength, entering the demultiplexer 170 through a single fiber, into several fiber outputs, using one fiber for each wavelength.

One or more additional dendritic taper regions may be added to the multiplexer or demultiplexer in a location between an input and/or output slab waveguide and the AWG, that is, adjacent to the AWG. For example, in addition to an input and/or an output dendritic taper region, at least one dendritic taper region may be located between the input and/or output slab waveguide and the AWG. For example, as shown in FIG. 12, the demultiplexer includes a first AWG taper region 186 located between the input slab waveguide 176 and the AWG 178. The first AWG taper region 186 may include dendritic tapers of the types discussed above to form a dendritic first AWG taper region. A second AWG taper region 188 is located between the AWG 178 and the output slab waveguide 180. The second AWG taper region 188 may include dendritic tapers of the types discussed as well to form a dendritic second AWG taper region. A multiplexer, as shown in FIG. 11, may similarly include a first AWG taper region 190 and a second AWG taper region 192 that may also include dendritic tapers. Any combination of AWG dendritic taper regions with input and/or output dendritic taper regions are within the scope an optical router of this invention. Preferably, the multiplexer or demultiplexer includes dendritic tapers in regions 186 and 188 for a demultiplexer and in regions 190 and 192 of FIG. 11 for as multiplexer as well a dendritic tapers in at least one of regions 104 or 112 of FIG. 11 or 174 or 182 of FIG. 12.

Figure 13:
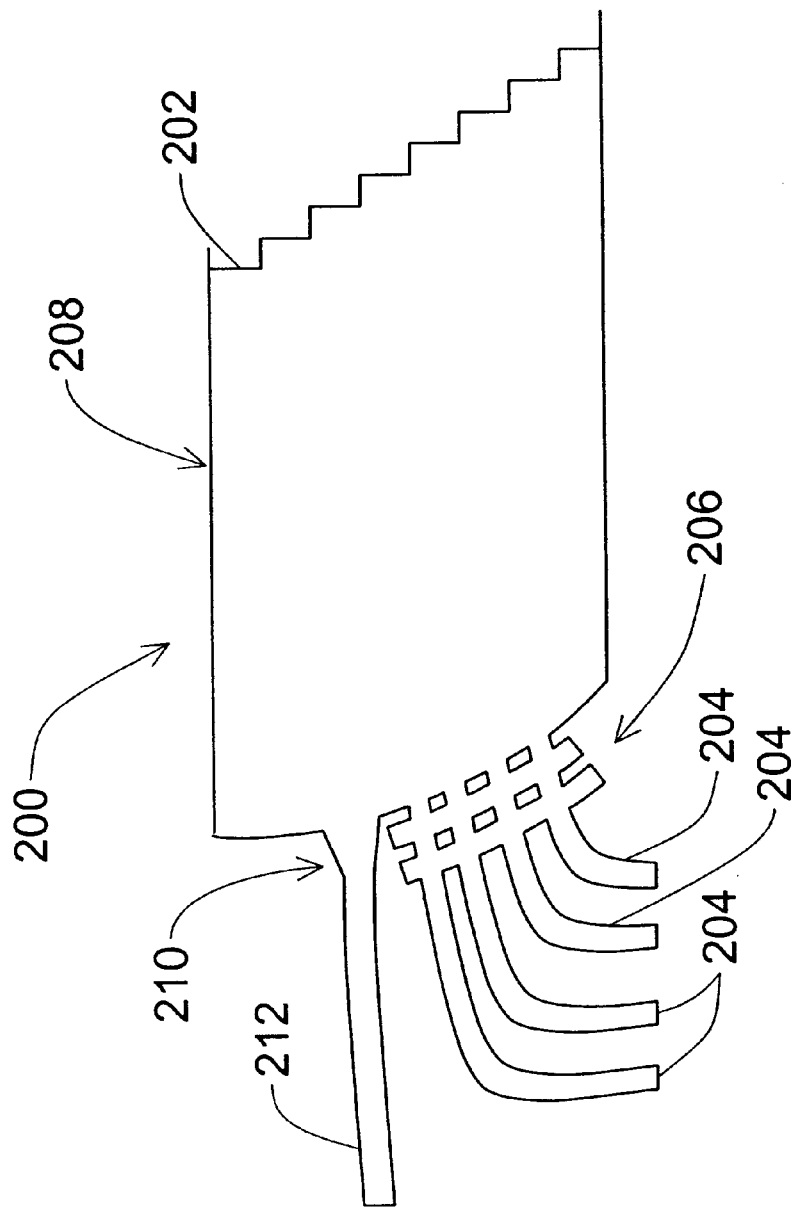
FIG. 13 is an integrated reflection grating multiplexer with a dendritic input taper region of the present invention.

FIG. 13 depicts a multiplexer 200 comprising an integrated reflection grating 202. The multiplexer 200 includes a plurality of input waveguides 204, a dendritic input taper region 206, a slab waveguide 208, an integrated reflection grating 202, a conventional output taper region 210, and at least one output waveguide 212. The input waveguides 204 are optically coupled to the slab waveguide 208 via the dendritic input taper region 206. The slab waveguide 208 and the output waveguide 212 are optically coupled via the output taper region 210. The thickness and material composition of each layer that comprise the slab waveguide and input/output waveguides are generally similar to those that may be used for an AWG-based optical router as discussed above. The width and bend of the waveguide may also be similar to the optical router discussed above, with the exception that the input and output waveguides 204, 212 contact a single slab waveguide 208 from a side that is common for both the input and output waveguides 204, 212. The integrated reflection grating 202 is typically formed by etching a pattern that resembles a diffraction grating through the slab waveguide 208 and depositing a high reflection coating onto the surface exposed by the etching process as is well-known in the art.

In operation, the input waveguides 204 direct optical power from input fibers (not shown) and couple the light to the slab waveguide 208. Light propagates through the slab waveguide 208 until it reaches the diffraction grating 202, whereupon the light is diffracted. A substantial portion of the diffracted light then propagates in a direction that is generally the reverse of the direction it had prior to encountering the diffraction grating 202. The diffracted light is focused to a location that depends on the wavelength of the light. Light that was admitted to a particular input port that is within a predetermined wavelength range is substantially coupled to the output waveguide 212.

It is understood that the dendritic taper region 206 is substantially similar to the embodiments for the input dendritic taper region 104 described above. FIG. 13 depicts the application of a dendritic taper region 206 in the region where the input waveguides 204 contact the slab waveguide 208. An alternative embodiment includes at least one dendritic taper in the output taper region 210 as well as the input region 206. An alternative embodiment has at least one dendritic taper in the output taper region 210 and conventional tapers in the input taper region 206. The invention may also apply to a demultiplexer or a more general integrated optical wavelength router comprising an integrated reflection grating.

One advantage of the instant invention is an increase in passband width as demonstrated by the experiments and the experimental data described below. Several AWG-based multiplexers of FIG. 4 and FIG. 11 were fabricated. Adjacent passbands were separated by 100 GHz. The AWG was designed to multiplex a maximum of 46 optical signals with optical frequencies in the range from approximately 196.1 THz to 191.6 THz. The pitch of the input taper array was approximately 16 μm. The maximum width of a conventional taper was approximately 12 μm and the maximum width of the trunk of a dendritic taper was approximately 12 μm. The lengths of the tapers used where within the range of approximately 150 μm to approximately 600 μm. The input and output taper combinations that were tested are tabulated in Table 1.

TABLE 1

| comparison group number | input taper design | output taper width (μm) | output taper design |
|---|---|---|---|
| 1 | Conventional | 22 | Conventional |
| 1 | Dendritic | 22 | Conventional |
| 2 | Conventional | 14 | Conventional |
| 2 | Dendritic | 14 | Conventional |
| 3 | Conventional | 15 | Conventional |
| 3 | Dendritic | 15 | Dendritic |

The objective of the experiment was to determine the effect of the application of the dendritic taper array to the input of the multiplexer on the passband width. The desirable affect is to increase the passband width at the −0.5 dB point (i.e., the value of "−0.5BW__AVE"), at the −1.0 dB reference level (i.e., the value of "−1.0BW__AVE"), and at the −3.0 dB reference level (i.e., the value of "−3.0BW__AVE"). Increasing the passband width at the −20 dB reference level is not necessarily desirable and, in fact, is usually undesirable. The experiment examines the effect of replacing the conventional taper array with the dendritic taper array in devices that fall into one of three categories listed as comparison group 1, comparison group 2 and comparison group 3 in Table 1. The values for the performance metrics in Table 2 and Table 3 represent values that have been averaged across all input waveguides for each device, and then averaged across all devices used in the experiment. For the data for the performance metrics in Table 4, the worst value for IL and RIPPLE in a particular device was determined for each device, then these values were averaged.

The data for comparison group 1, having conventional tapers at the output, is shown in Table 2. In this case the output taper width was approximately 22 μm. In this case, replacing the conventional input taper array with the dendritic taper array increased −0.5BW__AVE from 0.312 nm to 0.321 nm (an increase of 2.88%), increased −1.0BW__AVE from 0.444 nm to 0.464 nm (an increase of 4.50%), and increased −3.0BW__AVE from 0.735 nm to 0.781 nm (an increase of 6.26%). Furthermore, replacing the conventional input taper array with the dendritic taper array improved the IL by increasing the IL by approximately 0.16 dB. The improvement of performance on IL is significant because other techniques for increasing the passband width cause the IL performance to degrade. Replacing the conventional input taper array with the dendritic taper array increased the ADJ__ISO__AVE value by approximately 2.4 dB. The change in ADJ__ISO__AVE is of no consequence for a multiplexer application; however, for a demultiplexer application, the change in ADJ__ISO__AVE represents poorer performance. Because of the change in ADJ__ISO__AVE, it is preferable to apply the present invention to a multiplexer, rather than a demultiplexer.

TABLE 2

Data from Comparison Group 1

| parameter | conventional taper array | dendritic taper array |
|---|---|---|
| −0.5 BW__AVE (nm) | 0.312 | 0.321 |
| −1.0 BW__AVE (nm) | 0.444 | 0.464 |
| −3.0 BW__AVE (nm) | 0.735 | 0.781 |

The data for comparison group 2, having conventional tapers at the output, is shown in Table 3. The experimental conditions of this experiment are the same as for that shown in Table 2, except that in this case the output taper width was approximately 14 μm. In this case, replacing the conventional input taper array with the dendritic taper array increased −0.5BW__AVE from 0.191 nm to 0.211 nm (an increase of 10.47%), increased −1.0BW__AVE from 0.271 nm to 0.301 nm (an increase of 11.07%), and increased −3.0BW__AVE from 0.471 nm to 0.522 nm (an increase of 10.83%). Furthermore, replacing the conventional input taper array with the dendritic taper array did not significantly change the IL(the change was less than 0.1 dB). The lack of degradation of performance on IL is significant because other techniques for increasing the passband width cause the IL performance to degrade. Replacing the conventional input taper array with the dendritic taper array changed the ADJ__ISO__AVE from −26.40 dB to −19.87 dB. The change in ADJ__ISO__AVE is of no consequence for a multiplexer application; however, for a demultiplexer application, the change in ADJ__ISO__AVE represents poorer performance. Because of the change in ADJ__ISO__AVE, it is preferable to apply the present invention to a multiplexer, rather than a demultiplexer.

In comparison of the data from Table 2 with that of Table 3, it is evident that the application of the present invention provides a greater advantage when the output taper has a narrower width.

TABLE 3

Data from Comparison Group 2

| Parameter | conventional taper array | dendritic taper array |
|---|---|---|
| 0.5 BW__AVE(nm) | 0.191 | 0.211 |
| 1.0 BW__AVE (nm) | 0.271 | 0.301 |
| 3.0 BW__AVE (nm) | 0.471 | 0.522 |

The data for comparison group 3 is shown in Table 4. In this case, the comparison is made between a device that has conventional tapers at both the input and the output versus a device that has dendritic tapers at both the input and the output. This experiment included data from 30 devices using the conventional input taper array and 15 devices using the dendritic taper array. In this case the output taper width was approximately 15 μm. In this case, replacing the conventional input taper array with the dendritic taper array increased −1.0BW__AVE from 0.270 nm to 0.340 nm (an increase of 25.93%). Furthermore, replacing the conventional input taper array and the conventional output taper array with dendritic taper arrays did not significantly change the IL__WC, which remained approximately constant (the change was less than 0.1 dB. The lack of degradation of performance on IL_WC is significant because other techniques for increasing the passband width cause the IL_WC performance to degrade. Replacing the conventional input taper array and the conventional output taper array with dendritic taper arrays improved the value of the RIPPLE_WC from 0.897 dB to 0.647 dB, an improvement of 0.25 dB. The improvement in RIPPLE_WC is generally associated with an increase in passband width provided that a local minimum of transmissivity does not appear within the passband as the passband broadening takes place. The experimental evidence shown in Table 4 verifies that this type of adverse passband distortion does not take place as a consequence of the application of the dendritic taper array.

TABLE 4

Data from Comparison Group 3

| parameter | conventional taper array | dendritic taper array |
|---|---|---|
| 1.0 BW_AVE (nm) | 0.270 | 0.340 |
| RIPPLE_WC (dB) | 0.897 | 0.647 |

While the present invention has been described with reference to one or more particular variations, those skilled in the art will recognize that many changes may be made thereto without departing from the spirit and scope of the present invention. Each of these embodiments and obvious variations thereof are contemplated as falling within the spirit and scope of the claimed invention, which is set forth in the following claims.

What is claimed is:

1. An optical wavelength router comprising:
   at least one input waveguide;
   an input slab waveguide optically coupled to the at least one input waveguide;
   an arrayed waveguide grating optically coupled to the input slab waveguide; an output slab waveguide optically coupled to the input slab waveguide via the arrayed waveguide grating;
   at least one output waveguide optically coupled to the output slab waveguide; and
   at least one dendritic taper region optically coupled to at least one of the input slab waveguide and output slab waveguide; the dendritic taper region including at least one dendritic taper; the dendritic taper including a trunk having a first end and a second end; the dendritic taper including at least one branch optically coupled to the trunk;
   wherein the trunk has a width that increases monotonically from the first end to the second end such that the increase in width does not exceed approximately 2 μm per approximately 1 μm traversed from the first end to the second end.

2. An optical wavelength router comprising:
   at least one input waveguide;
   an input slab waveguide optically coupled to the at least one input waveguide;
   an arrayed waveguide grating optically coupled to the input slab waveguide;
   an output slab waveguide optically coupled to the input slab waveguide via the arrayed waveguide grating;
   at least one output waveguide optically coupled to the output slab waveguide; and
   at least one dendritic taper region optically coupled to at least one of the input slab waveguide and output slab waveguide; the dendritic taper region including at least one dendritic taper; the dendritic taper including a trunk having a first end and a second end; the dendritic taper including at least one branch optically coupled to the trunk;
   wherein the trunk has a width that decreases monotonically from the first end to the second end.

3. An optical wavelength router comprising:
   at least one input waveguide;
   an input slab waveguide optically coupled to the at least one input waveguide;
   an arrayed waveguide grating optically coupled to the input slab waveguide;
   an output slab waveguide optically coupled to the input slab waveguide via the arrayed waveguide grating;
   at least one output waveguide optically coupled to the output slab waveguide; and
   at least one dendritic taper region optically coupled to at least one of the input slab waveguide and output slab waveguide; the dendritic taper region including at least one dendritic taper; the dendritic taper including a trunk having a first end and a second end; the dendritic taper including at least one branch optically coupled to the trunk;
   wherein the trunk has a width that varies non-monotonically.

4. An optical wavelength router comprising:
   at least one input waveguide;
   an input slab waveguide optically coupled to the at least one input waveguide;
   an arrayed waveguide grating optically coupled to the input slab waveguide;
   an output slab waveguide optically coupled to the input slab waveguide via the arrayed waveguide grating;
   at least one output waveguide optically coupled to the output slab waveguide; and
   at least one dendritic taper region optically coupled to at least one of the input slab waveguide and output slab waveguide; the dendritic taper region including at least one dendritic taper; the dendritic taper including a trunk having a first end and a second end; the dendritic taper including at least one branch optically coupled to the trunk;
   wherein at least one branch of at least one dendritic taper is interconnected with at least one branch of another at least one dendritic taper.

5. An optical wavelength router comprising:
   at least one input waveguide;
   an input slab waveguide optically coupled to the at least one input waveguide;
   an arrayed waveguide grating optically coupled to the input slab waveguide;
   an output slab waveguide optically coupled to the input slab waveguide via the arrayed waveguide grating;
   at least one output waveguide optically coupled to the output slab waveguide; and
   at least one dendritic taper region optically coupled to at least one of the input slab waveguide and output slab waveguide; the dendritic taper region including at least one dendritic taper; the dendritic taper including a trunk having a first end and a second end; the dendritic taper including at least one branch optically coupled to the trunk;

wherein the branches increase in width with distance from the first end to the second end; wherein the branches define separation gaps therebetween; the separation gaps decreasing in width with distance from the first end to the second end.

6. An optical wavelength router comprising:

at least one input waveguide;

an input slab waveguide optically coupled to the at least one input waveguide;

an arrayed waveguide grating optically coupled to the input slab waveguide;

an output slab waveguide optically coupled to the input slab waveguide via the arrayed waveguide grating;

at least one output waveguide optically coupled to the output slab waveguide; and at least one dendritic taper region optically coupled to at least one of the input slab waveguide and output slab waveguide; the dendritic taper region including at least one dendritic taper; the dendritic taper including a trunk having a first end and a second end; the dendritic taper including at least one branch optically coupled to the trunk;

wherein the branches increase in width with distance from the first end to the second end;

wherein the branches define separation gaps therebetween; each branch having an associated separation gap such that each branch and its associated separation gap have a combined width that is not a constant.

7. The optical wavelength router of claim 1, 2, or 3 wherein the at least one branch is curved.

8. The optical wavelength router of claim 1, 2, 3, or 4 wherein the branches increase in width with distance from the first end to the second end.

9. The optical wavelength router of claim 8 wherein the branches define separation gaps therebetween; each of the separation gaps having a constant width.

10. The optical wavelength router of claim 8 wherein the branched define separation gaps therebetween; each branch having an associated separation gap such that each branch and its associated separation gap have a combined width that is a constant.

11. The optical wavelength router of claim 5 or 10 wherein the combined width of each branch and its associated separation gap has a constant value that is equal to 20 μm.

12. The optical wavelength router of claim 1, 2, 3, or 4 wherein the branches have a constant width with distance from the first end to the second end.

13. The optical wavelength router of claim 12 wherein the branches define separation gaps therebetween; each of the separation gaps having a constant width.

14. The optical wavelength router of claim 6 wherein the branches define separation gaps therebetween; the separation gaps decreasing in width with distance from the first end to the second end.

15. The optical wavelength router of claim 1, 2, 3, 4, 5, or 6 wherein the optical wavelength router is a multiplexer.

16. The optical wavelength router of claim 1, 2, 3, 4, 5, or 6 wherein the optical wavelength router is a demultiplexer.

17. An optical wavelength router comprising:

at least one input waveguide;

an input slab waveguide optically coupled to the at least one input waveguide;

an arrayed waveguide grating optically coupled to the input slab waveguide;

an output slab waveguide optically coupled to the input slab waveguide via the arrayed waveguide grating;

at least one output waveguide optically coupled to the output slab waveguide; and at least one dendritic taper region optically coupled to at least one of the input slab waveguide and output slab waveguide; the dendritic taper region including at least one dendritic taper; the dendritic taper including a trunk having a first end and a second end; the dendritic taper including at least one branch optically coupled to the trunk;

wherein the at least one branch is substantially perpendicular to the trunk.

18. An optical wavelength router comprising:

at least one input waveguide;

an input slab waveguide optically coupled to the at least one input waveguide;

an arrayed waveguide grating optically coupled to the input slab waveguide;

an output slab waveguide optically coupled to the input slab waveguide via the arrayed waveguide grating;

at least one output waveguide optically coupled to the output slab waveguide; and at least one dendritic taper region optically coupled to at least one of the input slab waveguide and output slab waveguide; the dendritic taper region including at least one dendritic taper; the dendritic taper including a trunk having a first end and a second end; the dendritic taper including at least one branch optically coupled to the trunk;

wherein one of the at least one dendritic taper region is an input dendritic taper region located between the at least one input waveguide and the input slab waveguide; the input dendritic taper region being optically coupled to the input slab waveguide and to the at least one input waveguide; the first end of the trunk of the input dendritic taper region being located distally from the input slab waveguide relative to the second end of the input dendritic taper region which is located proximately to input slab waveguide;

a first AWG dendritic taper region; the first AWG dendritic taper region being located between the input slab waveguide and the arrayed waveguide grating; the first AWG dendritic taper region being optically coupled to input slab waveguide and to the arrayed waveguide grating; the first end of the trunk of the first AWG dendritic taper region being located distally from the input slab waveguide relative to the second end of the trunk of the first AWG dendritic taper region which is located proximately to input slab waveguide.

19. The optical wavelength router of claim 18 further including a second AWG dendritic taper region; the second AWG dendritic taper region being located between the output slab waveguide and the arrayed waveguide grating; the second AWG dendritic taper region being optically coupled to the output slab waveguide and to the arrayed waveguide grating; the first end of the trunk of the second AWG dendritic taper region being located distally from the output slab waveguide relative to the second end of the trunk of the second AWG dendritic taper region which is located proximately to the output slab waveguide.

20. The optical wavelength router of claim 18 wherein the trunk of the input dendritic taper region has a width that increases monotonically from the first end to the second end such that the increase in width does not exceed approximately 2 µm per approximately 1 µm traversed from the first end to the second end.

21. The optical wavelength router of claim 18 wherein the trunk of the input dendritic taper region has a width that decreases monotonically from the first end to the second end.

22. The optical wavelength router of claim 18 wherein the trunk of the input dendritic taper region has a width that varies non-monotonically.

23. The optical wavelength router of claim 18 wherein at least one branch of at least one dendritic taper is interconnected with at least one branch of another at least one dendritic taper.

24. The optical wavelength router of claim 18 wherein at least one branch of at least one dendritic taper is not interconnected with at least one branch of another at least one dendritic taper.

25. The optical wavelength router of claim 18 wherein the at least one branch of at least one dendritic taper is curved.

26. The optical wavelength router of claim 18 wherein the at least one branch of at least one dendritic taper increases in width with distance from the first end to the second end.

27. The optical wavelength router of claim 26 wherein the branches define separation gaps therebetween; each of the separation gaps having a constant width.

28. The optical wavelength router of claim 18 wherein the at least one branch increases in width with distance from the first end to the second end;
wherein the branches define separation gaps therebetween; the separation gaps decreasing in width with distance from the first end to the second end.

29. The optical wavelength router of claim 26 wherein the branches define separation gaps therebetween; each branch having an associated separation gap such that each branch and its associated separation gap have a combined width that is a constant.

30. The optical wavelength router of claim 18 wherein the at least one branch increases in width with distance from the first end to the second end;
wherein the combined width of each branch and its associated separation gap has a constant value that is equal to 20 µm.

31. The optical wavelength router of claim 18 wherein the at least one branch increases in width with distance from the first end to the second end, and wherein the branches define separation gaps therebetween; each branch having an associated separation gap such that each branch and its associated separation gap have a combined width that is not a constant.

32. The optical wavelength router of claim 18 wherein the branches have a constant width with distance from the first end to the second end wherein the branches define separation gaps therebetween; the separation gaps decreasing in width with distance from the first end to the second end.

33. The optical wavelength router of claim 18 wherein the at least one branch is substantially perpendicular to the trunk.

34. The optical wavelength router of claim 18 wherein the at least one branch is not perpendicular to the trunk.

35. The optical wavelength router of claim 18 wherein the at least one branch has an index of refraction that is substantially the same as an index of refraction of the trunk.

36. An optical wavelength router comprising:
at least one input waveguide;
an input slab waveguide optically coupled to the at least one input waveguide;
an arrayed waveguide grating optically coupled to the input slab waveguide;
an output slab waveguide optically coupled to the input slab waveguide via the arrayed waveguide grating;
at least one output waveguide optically coupled to the output slab waveguide; and
at least one dendritic taper region optically coupled to at least one of the input slab waveguide and output slab waveguide; the dendritic taper region including at least one dendritic taper; the dendritic taper including a trunk having a first end and a second end; the dendritic taper including at least one branch optically coupled to the trunk;
wherein one of the at least one dendritic taper region is an output dendritic taper region located between the output slab waveguide and the at least one output waveguide; the output dendritic taper region being optically coupled to the output slab waveguide and to the at least one output waveguide; the first end of the trunk of the output dendritic taper region being located distally from the output slab waveguide relative to the second end of the output dendritic taper region which is located proximately to the output slab waveguide;
an input dendritic taper region located between the at least one input waveguide and the input slab waveguide; the input dendritic taper region being optically coupled to the input slab waveguide and to the at least one input waveguide; the first end of the trunk of the input dendritic taper region being located distally from the input slab waveguide relative to the second end of the input dendritic taper region which is located proximately to the input slab waveguide;
a first AWG dendritic taper region; the first AWG dendritic taper region being located between the input slab waveguide and the arrayed waveguide grating; the first AWG dendritic taper region being optically coupled to the input slab waveguide and to the arrayed waveguide grating; the first end of the trunk of the first AWG dendritic taper region being located distally from the input slab waveguide relative to the second end of the trunk of the first AWG dendritic taper region which is located proximately to the input slab waveguide.

37. An optical wavelength router comprising:
at least one input waveguide;
an input slab waveguide optically coupled to the at least one input waveguide;
an arrayed waveguide grating optically coupled to the input slab waveguide;
an output slab waveguide optically coupled to the input slab waveguide via the arrayed waveguide grating;
at least one output waveguide optically coupled to the output slab waveguide; and
at least one dendritic taper region optically coupled to at least one of the input slab 54 waveguide and output slab waveguide; the dendritic taper region including at least one dendritic taper; the dendritic taper including a trunk having a first end and a second end; the dendritic taper including at least one branch optically coupled to the trunk;
wherein one of the at least one dendritic taper region is an output dendritic taper region located between the output slab waveguide and the at least one output waveguide; the output dendritic taper region being optically coupled to the output slab waveguide and to the at least one output waveguide; the first end of the trunk of the output dendritic taper region being located distally from the output slab waveguide relative to the second end of the output dendritic taper region which is located proximately to the output slab waveguide;

a first AWG dendritic taper region; the first AWG dendritic taper region being located between the input slab waveguide and the arrayed waveguide grating; the first AWG dendritic taper region being optically coupled to the input slab waveguide and to the arrayed waveguide grating; the first end of the trunk of the first AWG dendritic taper region being located distally from the input slab waveguide relative to the second end of the trunk of the first AWG dendritic taper region which is located proximately to the input slab waveguide;

a second AWG dendritic taper region; the second AWG dendritic taper region being located between the output slab waveguide and the arrayed waveguide grating; the second AWG dendritic taper region being optically coupled to the output slab waveguide and to the arrayed waveguide grating; the first end of the trunk of the second AWG dendritic taper region being located distally from the output slab waveguide relative to the second end of the trunk of the second AWG dendritic taper region which is located proximately to the output slab waveguide.

38. The optical wavelength router of claim 36 further including a second AWG dendritic taper region; the second AWG dendritic taper region being located between the output slab waveguide and the arrayed waveguide grating; the second AWG dendritic taper region being optically coupled to the output slab waveguide and to the arrayed waveguide grating; the first end of the trunk of the second AWG dendritic taper region being located distally from the output slab waveguide relative to the second end of the trunk of the second AWG dendritic taper region which is located proximately to the output slab waveguide.

39. The optical wavelength router of claim 36 or 37 wherein the trunk has a width that increases monotonically from the first end to the second end such that the increase in width does not exceed approximately 2 $\mu$m per approximately 1 $\mu$m traversed from the first end to the second end.

40. The optical wavelength router of claim 36 or 37 wherein at least one branch of at least one dendritic taper is interconnected with at least one branch of another at least one dendritic taper.

41. The optical wavelength router of claim 36 or 37 wherein the at least one branch is substantially perpendicular to the trunk.

42. An optical wavelength router comprising:

at least one input waveguide;

an slab waveguide optically coupled to the at least one input waveguide; the slab waveguide including an integrated reflection grating;

at least one output waveguide optically coupled to the slab waveguide; and at least one dendritic taper region including at least one dendritic taper; the dendritic taper including a trunk having a first end and a second end; the dendritic taper including at least one branch optically coupled to the trunk;

wherein the trunk has a width that increases monotonically from the first end to the second end such that the increase in width does not exceed approximately 2 $\mu$m per approximately 1 $\mu$m traversed from the first end to the second end.

43. The optical wavelength router of claim 42 wherein at least one branch of at least one dendritic taper is interconnected with at least one branch of another at least one dendritic taper.

44. The optical wavelength router of claim 42 wherein at least one branch of at least one dendritic taper is not interconnected with at least one branch of another at least one dendritic taper.

45. The optical wavelength router of claim 42 wherein the at least one branch is curved.

46. The optical wavelength router of claim 42 wherein the branches increase in width with distance from the first end to the second end.

47. The optical wavelength router of claim 46 wherein the branches define separation gaps therebetween; each of the separation gaps having a constant width.

48. The optical wavelength router of claim 46 wherein the branches define separation gaps therebetween; the separation gaps decreasing in width with distance from the first end to the second end.

49. The optical wavelength router of claim 46 wherein the branches define separation gaps therebetween; each branch having an associated separation gap such that each branch and its associated separation gap have a combined width that is a constant.

50. The optical wavelength router of claim 49 wherein the combined width of each branch and its associated separation gap is 20 $\mu$m.

51. The optical wavelength router of claim 46 wherein the branches define separation gaps therebetween; each branch having an associated separation gap such that each branch and its associated separation gap have a combined width that is not a constant.

52. The optical wavelength router of claim 42 wherein the branches have a constant width with distance from the first end to the second end.

53. The optical wavelength router of claim 52 wherein the branches define separation gaps therebetween; each of the separation gaps having a constant width.

54. The optical wavelength router of claim 52 wherein the branches define separation gaps therebetween; the separation gaps decreasing in width with distance from the first end to the second end.

55. The optical wavelength router of claim 42 wherein the optical wavelength router is a multiplexer.

56. The optical wavelength router of claim 42 wherein the optical wavelength router is a demultiplexer.

* * * * *